US012726546B2

(12) United States Patent
Singh et al.

(10) Patent No.: US 12,726,546 B2
(45) Date of Patent: Sep. 1, 2026

(54) OPERATIONAL SYSTEM PARAMETER RETRIEVAL AND INSTALLATION IN AN ASSESSMENT ENVIRONMENT

(71) Applicant: Boost SubscriberCo L.L.C., Englewood, CO (US)

(72) Inventors: Rohit Singh, Denver, CO (US); Joshua Garcia De La Torre, Highlands Ranch, CO (US); Levi Simeon Eichelberg, Highlands Ranch, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 92 days.

(21) Appl. No.: 18/962,251

(22) Filed: Nov. 27, 2024

(65) Prior Publication Data

US 2026/0149752 A1 May 28, 2026

(51) Int. Cl.
*G06F 9/44* (2018.01)
*G06F 1/26* (2006.01)
(Continued)

(52) U.S. Cl.
CPC ................ *H04L 67/34* (2013.01); *G06F 8/71* (2013.01); *H04L 67/565* (2022.05); *H04L 67/61* (2022.05)

(58) Field of Classification Search
CPC ....... H04L 67/34; H04L 67/565; H04L 67/61; G06F 8/71
(Continued)

(56) References Cited

U.S. PATENT DOCUMENTS 6,367,073 B2 * 4/2002 Elledge ..................... G06F 8/61 715/810
6,996,818 B2 * 2/2006 Jacobi ..................... G06F 8/658 717/172

(Continued)

FOREIGN PATENT DOCUMENTS

BR 112017028567 A2 * 9/2018 ........... H04L 67/141
EP 3998760 A2 * 5/2022 ............... G06F 8/71

OTHER PUBLICATIONS

Rohit Singh, Automation of Evaluation Operations in an Assessment Environment, U.S. Appl. No. 18/962,088, Filed: Nov. 27, 2024, pp. 1-85.

(Continued)

*Primary Examiner* — Umar Cheema
*Assistant Examiner* — Golam Mahmud
(74) *Attorney, Agent, or Firm* — Kilpatrick Townsend & Stockton LLP

(57) ABSTRACT

An apparatus comprises a memory and a processor communicatively coupled to one another. The processor is configured to access one or more release versions of one or more services matching the communication device information, copy a first release version onto a centralized data repository, transform a predefined format of the first release version to a localized format that associates the first release version to the centralized data repository, parse the first release version to determine information elements, categorize each information element, generate release triggers for each information element in accordance with corresponding priority tiers, attach the release triggers to the first release version comprising the localized format in the centralized data repository, generate a report referencing that the first release version is available for installing at the centralized data repository, and broadcast the report to the at least one (Continued)

communication device matching the communication device information.

20 Claims, 9 Drawing Sheets

(51) Int. Cl.

| | |
|---|---|
| ***G06F 8/71*** | (2018.01) |
| ***G06F 9/445*** | (2018.01) |
| ***G06F 17/30*** | (2006.01) |
| ***H04L 67/00*** | (2022.01) |
| ***H04L 67/565*** | (2022.01) |
| ***H04L 67/61*** | (2022.01) |

(58) Field of Classification Search
USPC .......................................................... 709/224
See application file for complete search history.

(56) References Cited

U.S. PATENT DOCUMENTS

| | | | | |
|---|---|---|---|---|
| 8,230,245 | B2 * | 7/2012 | Khatri | G06F 11/3495 713/320 |
| 9,684,499 | B2 * | 6/2017 | Mody | G06F 8/61 |
| 10,382,262 | B1 * | 8/2019 | Gupta | H04L 67/34 |
| 11,202,213 | B2 * | 12/2021 | Hashimoto | H04W 8/24 |
| 11,556,398 | B2 * | 1/2023 | Tan | G06F 3/067 |
| 2020/0073650 | A1 * | 3/2020 | Peschansky | H04L 67/60 |
| 2022/0121569 | A1 * | 4/2022 | Bonam | G06F 8/71 |

OTHER PUBLICATIONS

Rohit Singh, Integration of Operational System Parameters in Communication Devices in an Assessment Environment, U.S. Appl. No. 18/962,164, Filed: Nov. 27, 2024, pp. 1-87.

Rohit Singh, Automated Generation of Assessment Reports in a Assessment Enviroment, U.S. Appl. No. 18/962,316, Filed: Nov. 27, 2024, pp. 1-82.

* cited by examiner

OPERATIONAL SYSTEM PARAMETER RETRIEVAL AND INSTALLATION IN AN ASSESSMENT ENVIRONMENT

TECHNICAL FIELD

The present disclosure relates generally to retrieval operations and installation operations performed on communication terminals, and more specifically to a system and method to retrieve and install operational system parameters in an assessment environment.

BACKGROUND

In some wireless communications systems, user equipment comprising wireless communication capabilities may need to be performed in accordance with one or more communication standards. The user equipment may not be allowed to communicate in association with one or more communication networks unless the user equipment is certified to connect with the communication networks in accordance with the communication standards by a certification organization. In some instances, the user equipment may be manufactured by an original equipment manufacturer (OEM) that is different from the certification organization. In this regard, certification organizations that rely on OEM software updates often face challenges in checking for new releases and downloading builds. This process may be time-consuming and prone to errors, leading to delays in accessing the latest software. Further, any certification operations may be delayed, interrupted, and/or cancelled if specific software builds are not installed in the user equipment to evaluate operations at the user equipment.

SUMMARY OF THE DISCLOSURE

In one or more embodiments, the system and method disclosed herein retrieve and install operational system parameters in an assessment environment. In this regard, the system may be configured to perform one or more retrieval operations and/or one or more installation operations. The one or more retrieval operations may be one or more operations in which one or more parameters associated with an operating system (OS) and/or a service (e.g., applications) are retrieved from one or more OEM-controlled systems to be installed in one or more communication devices (e.g., user equipment). The operational system parameters may be one or more parameters configured to install a specific OS and/or a specific service in the one or more communication devices. After installing the OS and/or the one or more services in the communication devices, the communication devices may be configured to perform one or more specific wireless communication operations associated with the specific OS and/or one or more specific services. The one or more installation operations may be one or more operations in which the one or more operational system parameters are installed as part of an OS build and/or a service build in one or more communication devices. Further, the one or more installation operations may configure the OS and/or the one or more services 155 to perform one or more specific wireless communication operations. The installation operations may be configured to configure a newly installed build of a specific OS and/or a specific service on a specific communication device and/or to reconfigure a previously installed build of the specific OS and/or the specific service in the specific communication device. Installation of the operational system parameters may be performed in an assessment environment where the installation of the OS and performance of the communication devices while executing the one or more wireless communication operations may be evaluated. The assessment environment may be one or more physical locations and/or stages of testing and/or evaluating in which production analysis is performed on some, or all, software and/or hardware elements of communication devices to obtain a technical approval. The technical approval may reference that one or more communication devices are allowed to connect with one or more communication networks in accordance with one or more communication standards. Further, a technical approval of a specific communication device may be a results-driven certification and/or documentation referencing that the specific communication device is approved to establish one or more communication links with a communication network via a certification entity (e.g., a communication carrier and/or an entity configured to provide connectivity between communication devices and communication networks). In some embodiments, the technical approval references that the specific communication device comprises up-to-date builds of software applications and/or peripherals and/or interfaces (e.g., sensors, processor, memory, and other electronic components). The technical approval may reference that the specific communication device meets a compliance standard set forth by an organization that manufactured some, or all, of the specific communication device and/or a compliance standard set forth by an organization that facilitates some, or all, operations performed by the specific communication device.

In one or more embodiments, the system described herein is integrated into a practical application of improving certification procedures of a communication device in production and/or pre-production stages. Herein, contrary to certain certification operations that may be performed manually and are prone to errors, the system is configured to determine whether specific communication devices are allowed to connect and/or interact with a communication network by automating selection of configuration parameters, retrieval of service builds, and determination of feedback information associated with a certification process. By automatically starting, monitoring, and/or concluding one or more certification operations for the specific communication devices, the system provides scalability of certification operations while removing manual analyses and/or user intervention. Further, instead of relying on software builds stored on manufacturer-controlled systems, the system is configured to dynamically retrieve new builds of one or more specific services, transform the releases from an origin format to a destination format, and indexing the releases in a local repository configured to enable retrieval of the indexed releases. In this regard, the system provides the practical application of enabling access to the newest versions of services in a compatible format.

In one or more embodiments, the system described herein is integrated into a technical advantage of reducing processor and memory usage in a computer system, because one or more processors associated with the system are configured to inhibit, reduce, and/or eliminate redundant evaluation operations while certifying communication devices as part of one or more certification processes. Herein, the redundant evaluation operations may be tracking operations, monitoring operations, and/or analysis operations of service builds that consume processor resources and memory resources at a given communication device while services are obtained and/or installed in the device to perform one or more wireless communication operations. The system may be configured to eliminate, inhibit, and/or reduce these redundant operations by proactively and automatically retrieving, reformatting, and installing service builds from manufacturer-controlled systems prior to the execution of the wireless communication operations in the communication devices. Further, the system may be configured to eliminate, inhibit, and/or reduce these redundant operations by automatically selecting new releases of services to be installed in the communication device and configured to perform a target number of the communication operations. In particular, after determining certification operations for one or more communication devices, the system is configured to proactively determine features of new releases for specific services associated with the certification operations, retrieve certain releases of the specific services that meet and/or match device configuration information, and transform a format of the releases from a first format determined by a manufacturer of the service and/or the communication device to a second format determined by the system. For example, after determining that one or more specific wireless communication operations are to be evaluated in a specific communication device, the system is configured to automatically determine services and specific release builds of the services that streamline execution of the specific wireless communication operations while providing feedback on predefined key elements on the performance of the specific communication device.

In one or more embodiments, the system and the method may be performed by an apparatus, such as a server, communicatively coupled to multiple network components in a core network, one or more base stations in a radio access network, and one or more user equipment. Further, the system may be a wireless communication system, which comprises the apparatus. In addition, the system and the method may be performed as part of a process performed by the apparatus communicatively coupled to the network components in the core network. As a non-limiting example, the apparatus may comprise a memory and a processor communicatively coupled to one another. The memory may be operable to store communication device information associated with one or more communication devices. Each communication device information may comprise manufacturing information. The processor may be configured to access one or more release versions of one or more services matching the communication device information, sort the release versions of the one or more services in accordance with a release date, and determine a first release version out of the release versions. The first release version may comprise a first release date. The processor may be configured to copy the first release version onto a centralized data repository. The first release version may comprise a predefined format that associates the first release version to the centralized data repository. The processor may be configured to transform the predefined format to a localized format that associates the first release version to the centralized data repository and parse the first release version to determine information elements. Each information element of the information elements may reference one or more changes to one or more communication parameters of at least one communication device matching the communication device information. Each communication parameter of the one or more communication parameters may be configured to trigger one or more communication operations in the at least one communication device. Further, the processor may be configured to categorize each information element of the information elements based on one or more priority tiers corresponding to the one or more changes and generate release triggers for each information element of the information elements in accordance with corresponding priority tiers. The release triggers may be configured to reference one or more of the information elements associated with the corresponding priority tiers. The processor may be configured to attach the release triggers to the first release version comprising the localized format in the centralized data repository, generate a report referencing that the first release version is available for installing at the centralized data repository, and broadcast the report to the at least one communication device matching the communication device information.

Certain embodiments of this disclosure may comprise some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
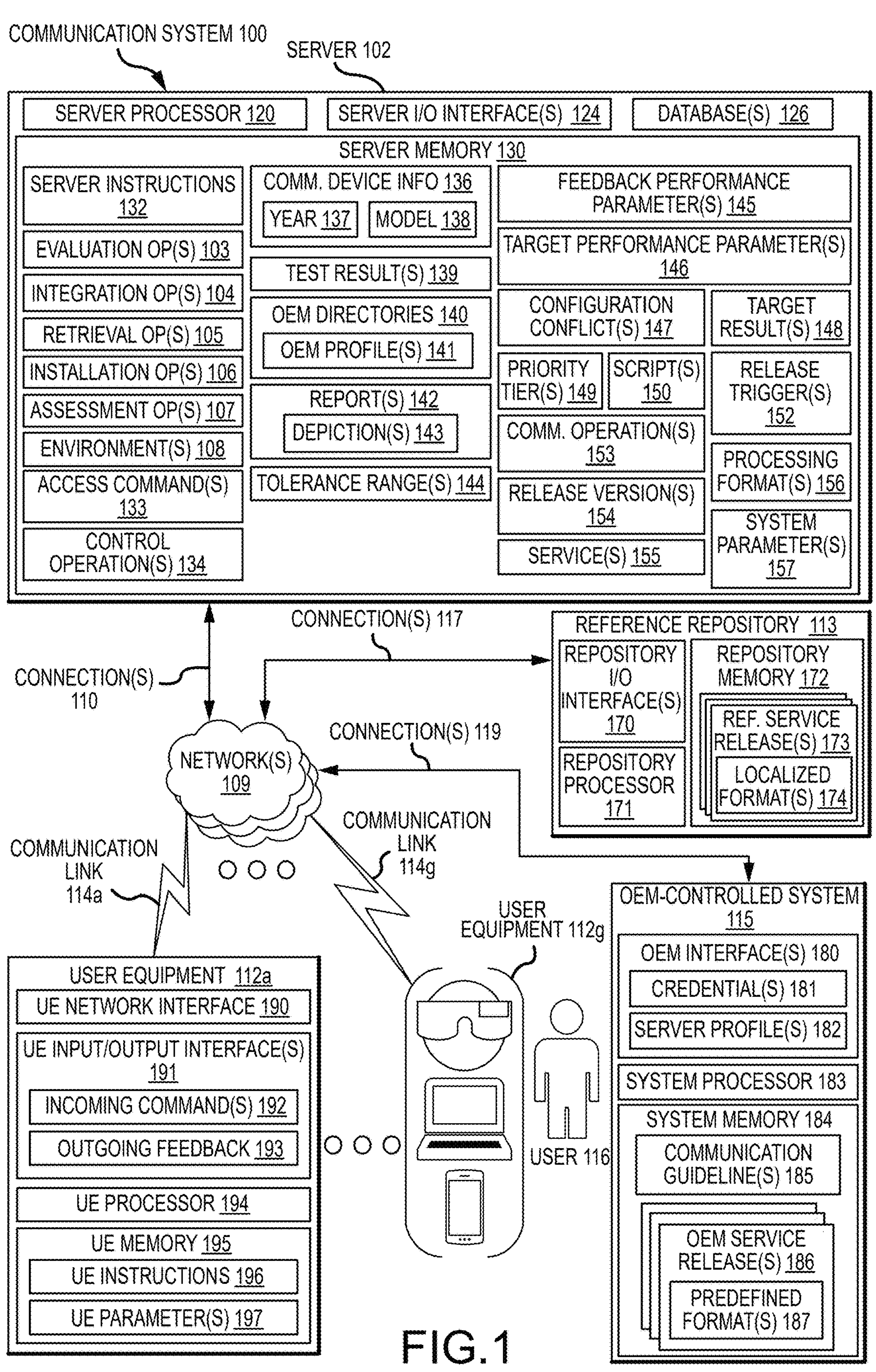
FIG. 1 illustrates an example communication system in accordance with one or more embodiments.
Figure 2:
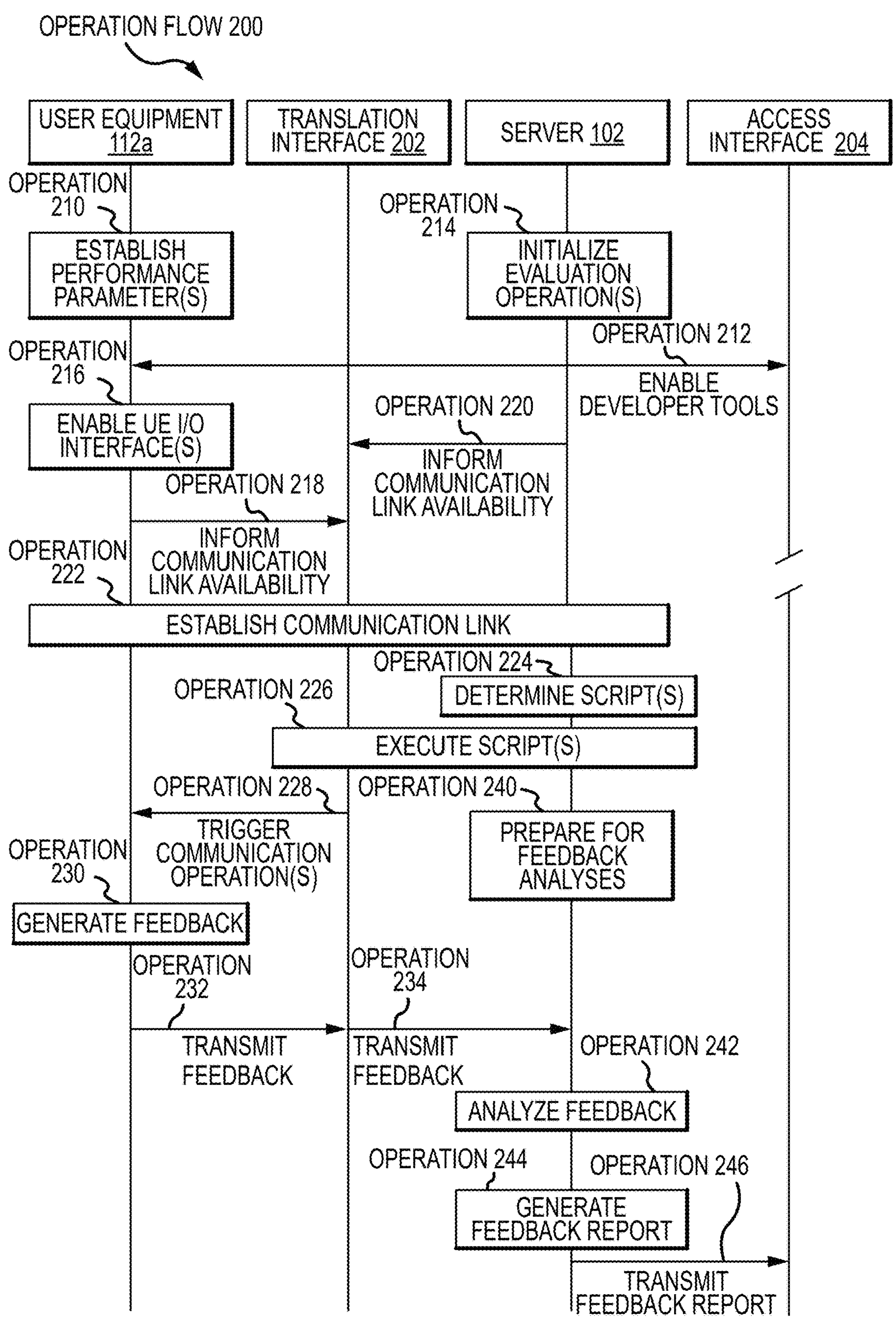
FIG. 2 illustrates an operation flow to automate evaluation operations in an assessment environment, in accordance with one or more embodiments.
Figure 3:
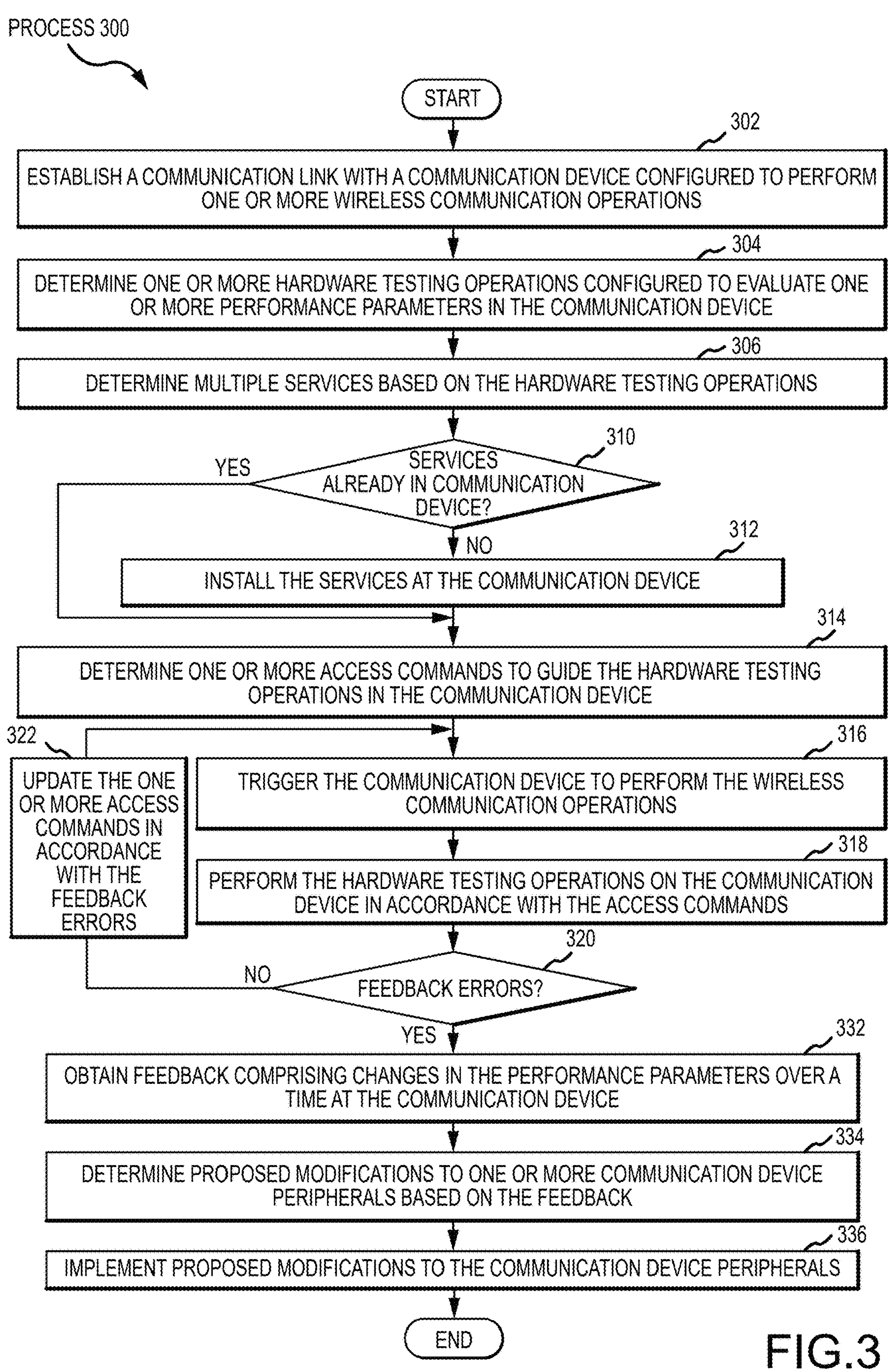
FIG. 3 illustrates an example flowchart of a method to perform one or more operations of the operation flow in FIG. 2, in accordance with one or more embodiments.
Figure 4:
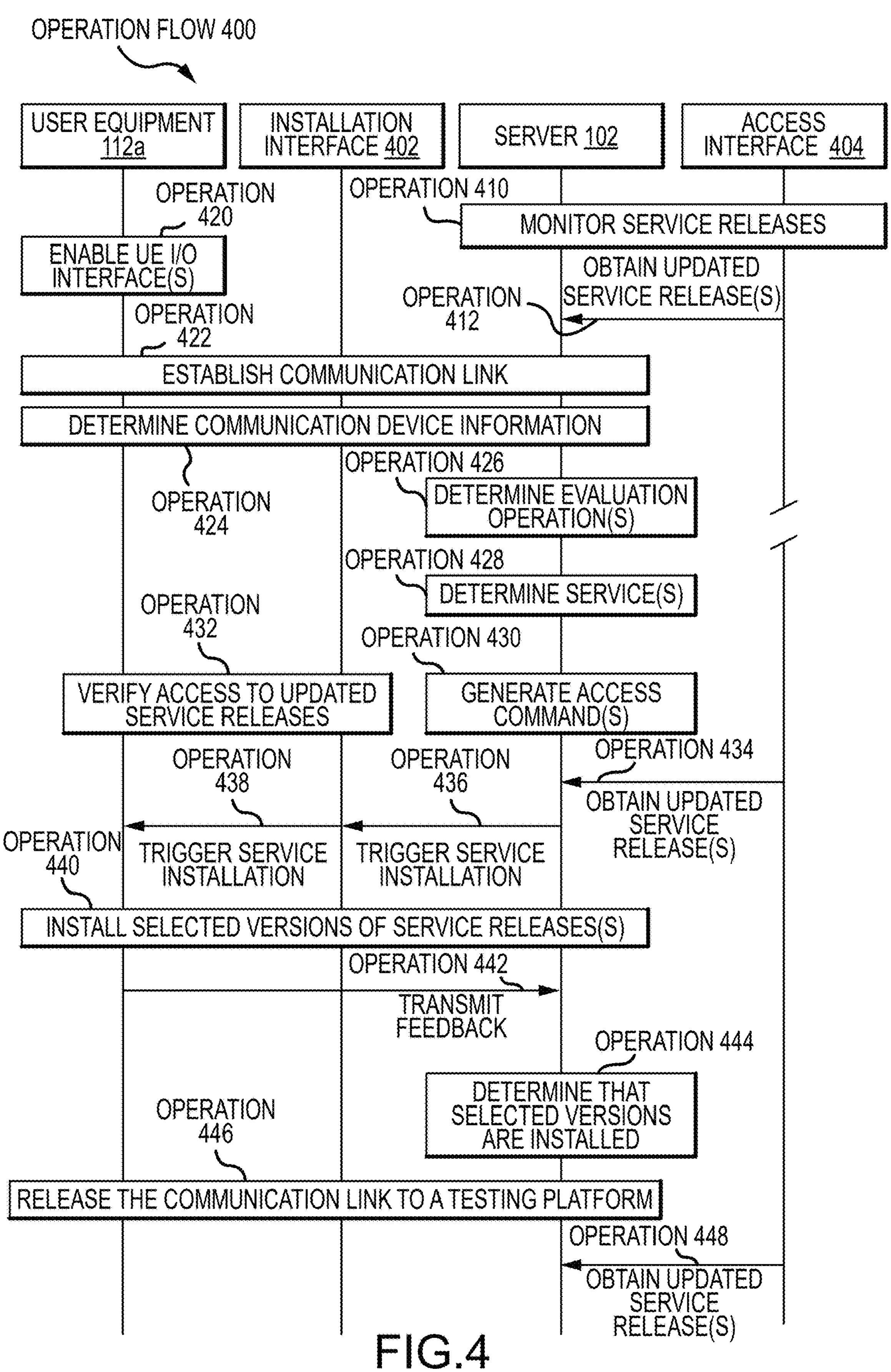
FIG. 4 illustrates an operation flow to integrate operational system parameters in communication devices in an assessment environment, in accordance with one or more embodiments.
Figure 5:
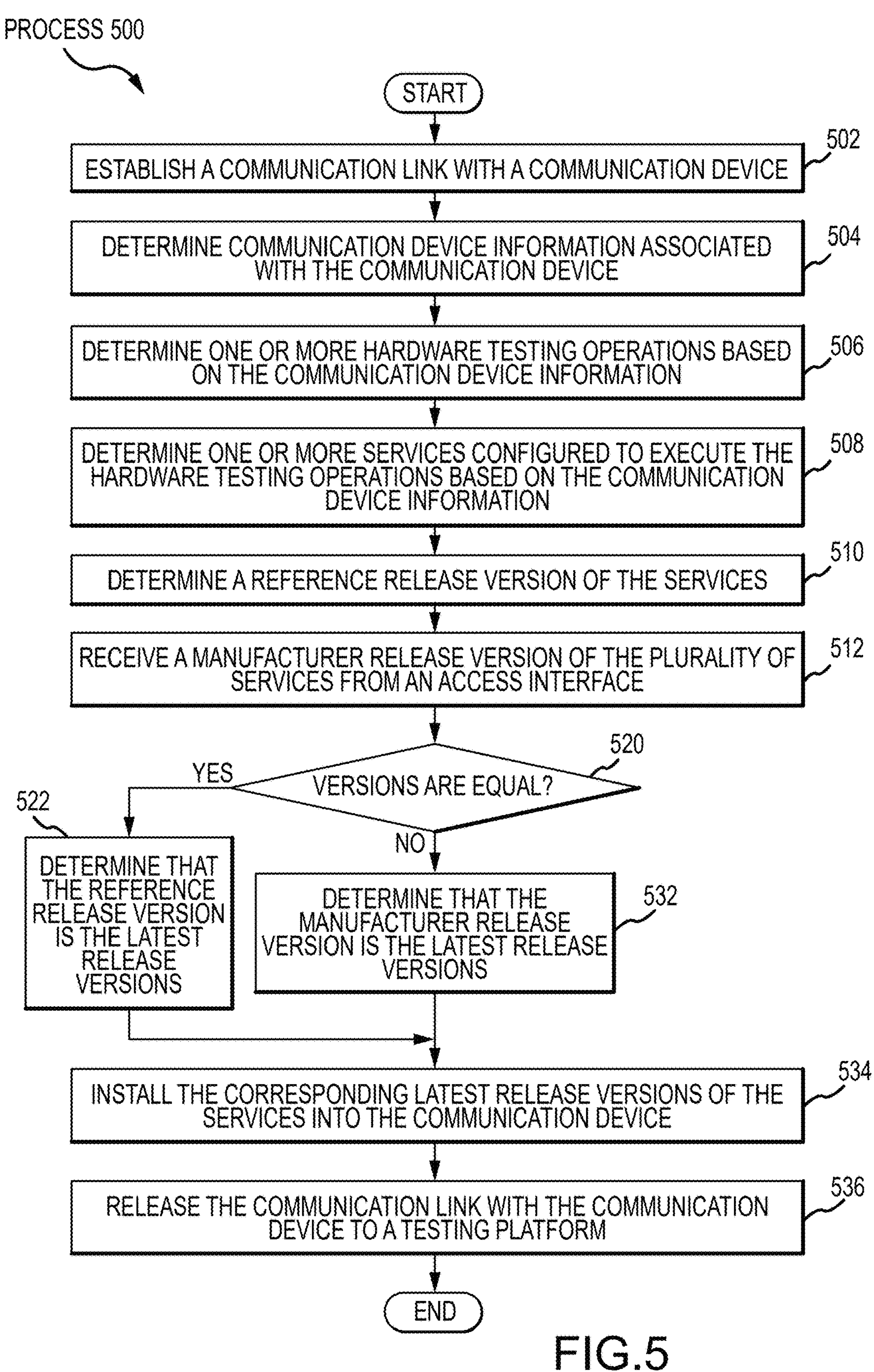
FIG. 5 illustrates an example flowchart of a method to perform one or more operations of the operation flow in FIG. 4, in accordance with one or more embodiments.
Figure 6:
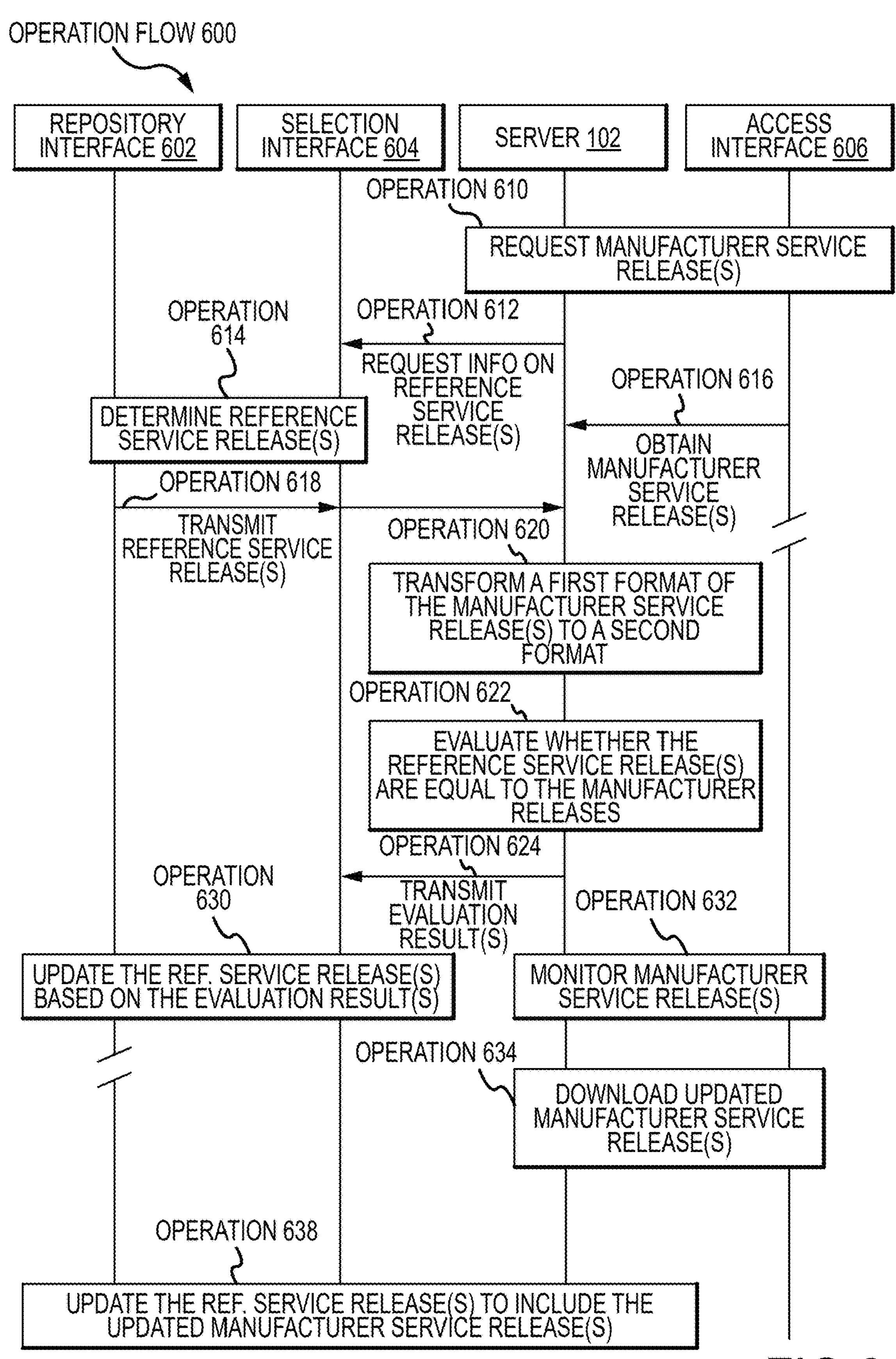
FIG. 6 illustrates an operation flow to retrieve and install operational system parameters in an assessment environment, in accordance with one or more embodiments.
Figure 7:
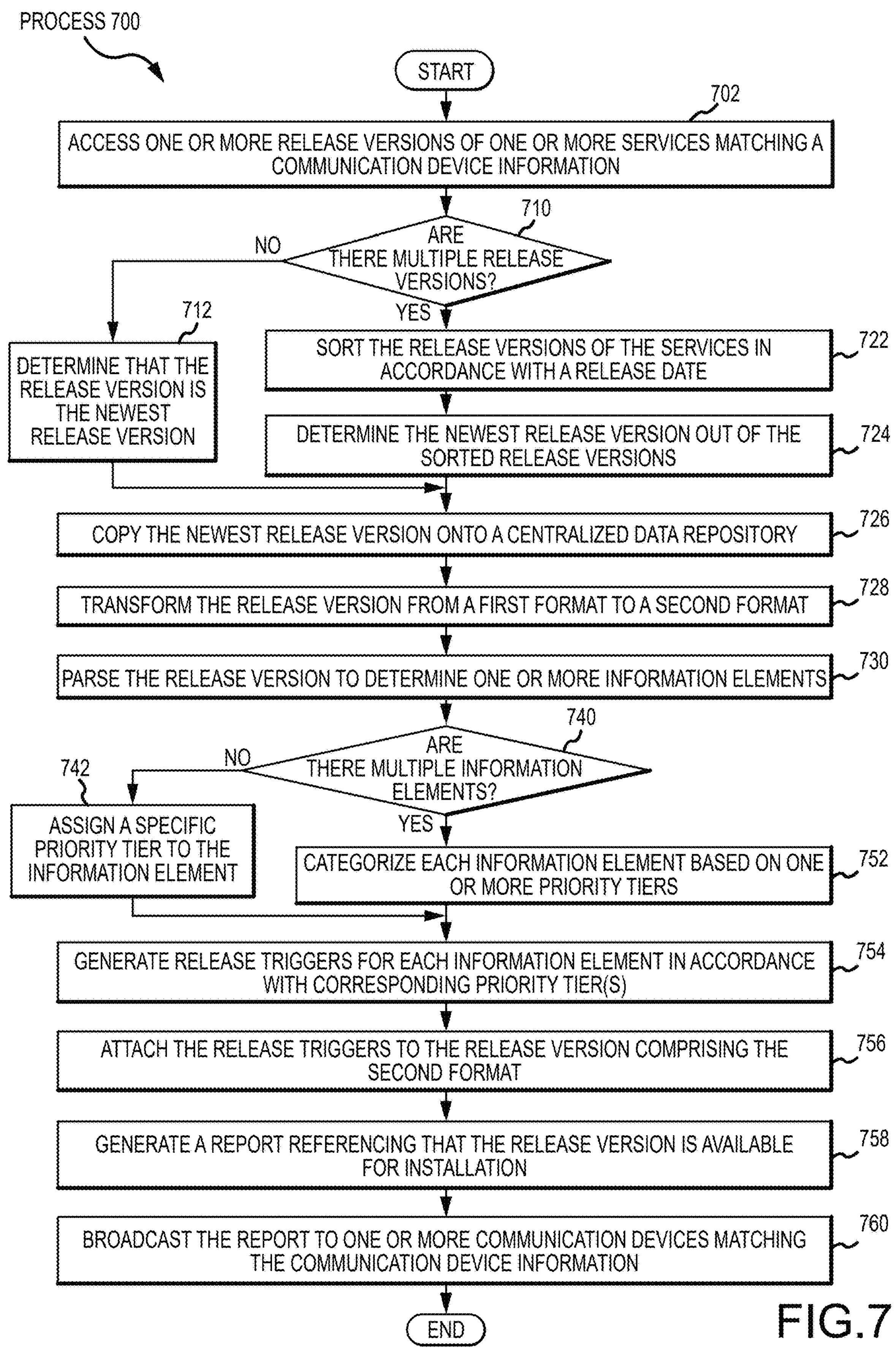
FIG. 7 illustrates an example flowchart of a method to perform one or more operations of the operation flow in FIG. 6, in accordance with one or more embodiments.
Figure 8:
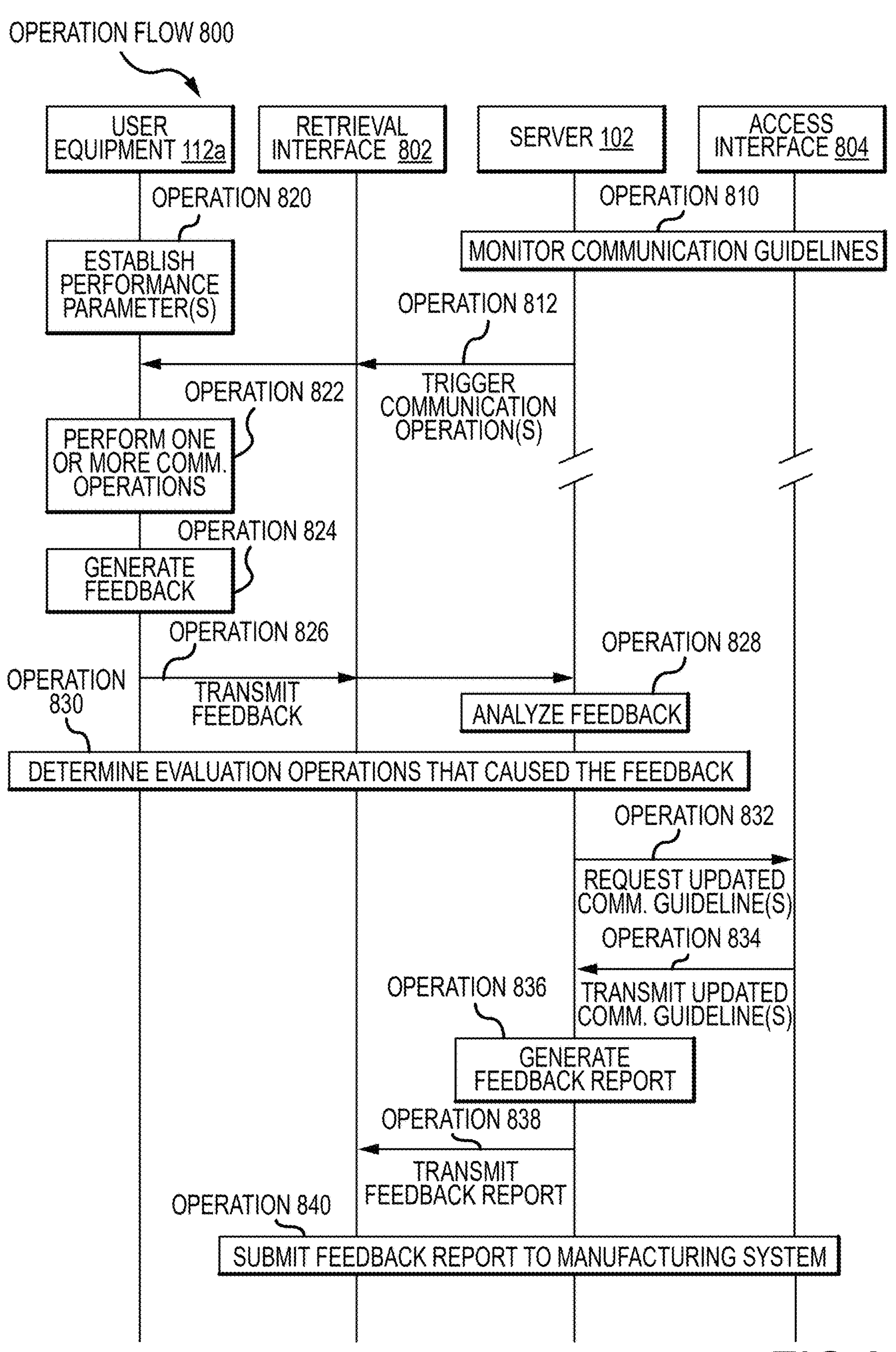
FIG. 8 illustrates an operation flow to automate generation of assessment reports in an assessment environment, in accordance with one or more embodiments.
Figure 9:
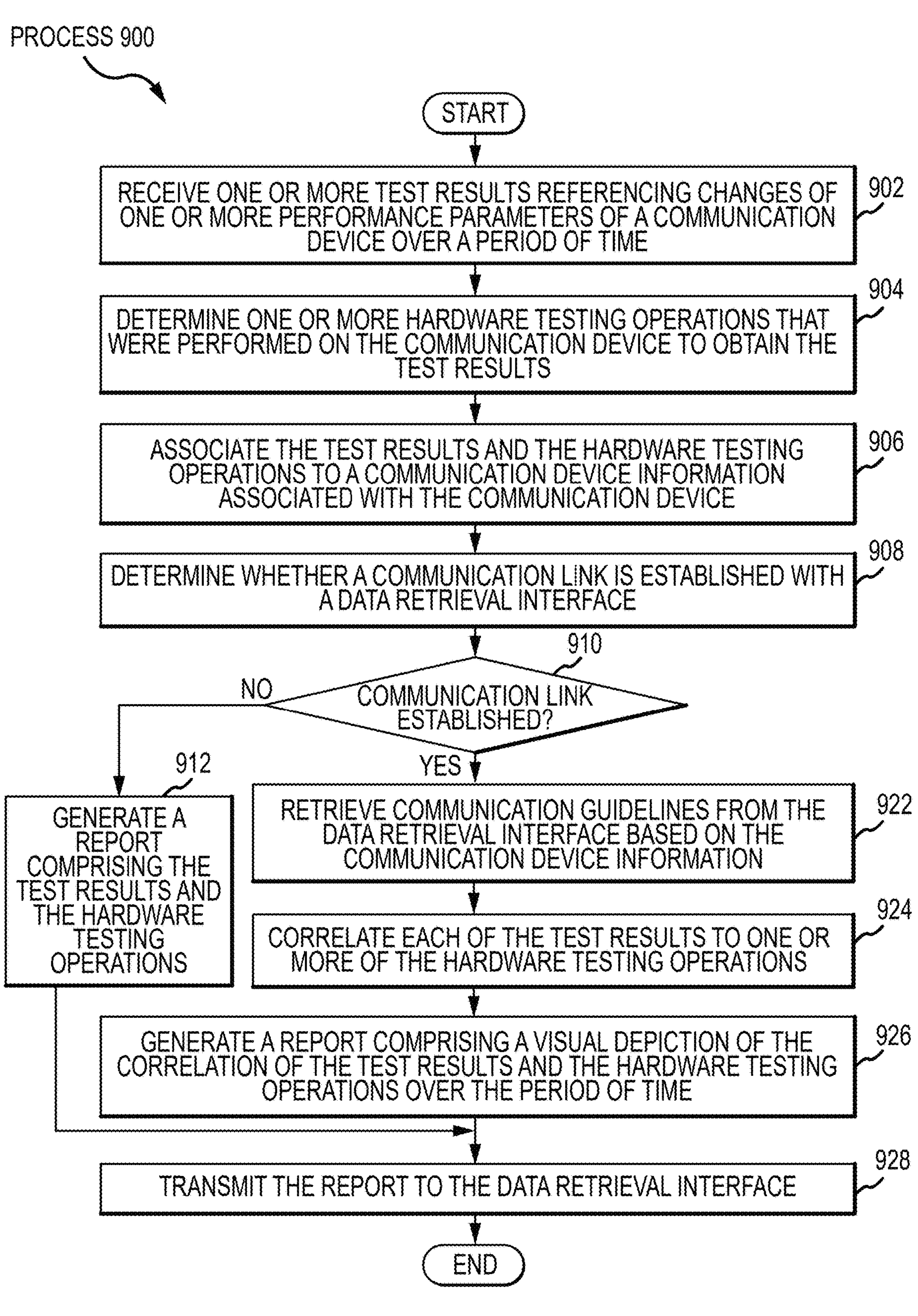
FIG. 9 illustrates an example flowchart of a method to perform one or more operations of the operation flow in FIG. 8, in accordance with one or more embodiments.

In one or more embodiments, systems and methods described herein are configured to one or more operations in an assessment environment. In one or more embodiments, FIG. 1 illustrates a communication system 100 in which a server 102 is configured to perform one or more evaluation operations 103, one or more integration operations 104, one or more retrieval operations 105, one or more installation operations 106, and/or one or more assessment operations 107. FIG. 2 illustrates an operation flow 200 in which the communication system 100 of FIG. 1 is configured to perform the one or more evaluation operations 103. FIG. 3 illustrates a process 300 to implement the operation flow 200 of FIG. 2. FIG. 4 illustrates an operation flow 400 in which the communication system 100 of FIG. 1 is configured to perform the one or more integration operations 104. FIG. 5 illustrates a process 500 to implement the operation flow 400 of FIG. 4. FIG. 6 illustrates an operation flow 600 in which the communication system 100 of FIG. 1 is configured to perform the one or more retrieval operations 105 and the one or more installation operations 106. FIG. 7 illustrates a process 700 to implement the operation flow 600 of FIG. 6. FIG. 8 illustrates an operation flow 800 in which the communication system 100 of FIG. 1 is configured to perform the one or more assessment operations 107. FIG. 9 illustrates a process 900 to implement the operation flow 800 of FIG. 8.

Communication System Overview

FIG. 1 illustrates a diagram of a communication system 100 (e.g., a wireless communication system) comprises a server 102 configured to dynamically organize, exchange, and monitor information relating to one or more evaluation operations 103, one or more integration operations 104, one or more retrieval operations 105, one or more installation operations 106, and one or more assessment operations 107 in one or more assessment environments 108. The assessment environments 108 may be one or more physical locations and/or stages of testing in which production analysis is performed on some, or all, software and/or hardware elements of communication devices to obtain a technical approval. A technical approval of a specific communication device may be a results-driven certification and/or documentation referencing that the specific communication device is approved to establish one or more communication links with a communication network via a carrier. In some embodiments, the technical approval references that the specific communication device comprises up-to-date builds of software applications and/or peripherals and/or interfaces (e.g., sensors, processor, memory, and other electronic components). The technical approval may reference that the specific communication device meets a compliance standard set forth by an organization that manufactured some, or all, of the specific communication device and/or a compliance standard set forth by an organization that facilitates some, or all, operations performed by the specific communication device.

In the communication system 100 of FIG. 1, the server 102 may be communicatively coupled to the one or more networks 109 via one or more connections 110. In FIG. 1, the server 102 is communicatively coupled to multiple user equipment 112*a*-112*g* (collectively, user equipment 112) via multiple corresponding communication links 114*a*-114*g* (collectively, communication links 114) established between each user equipment 112 and the networks 109. As represented by a user equipment 112*g*, the user equipment 112 may be operated by one or more users 116. In the example of FIG. 1, the server 102 may be communicatively coupled to multiple additional devices in the communication system 100. Further, the server 102 may be communicatively coupled to at least one reference repository 113 via the one or more connections 110 between the server 102 and the one or more networks 109 and one or more connections 117 between the one or more networks 109 and the reference repository 113. The server 102 may be communicatively coupled to at least one original equipment manufacturer (OEM)-controlled system 115 via the one or more connections 110 between the server 102 and the one or more networks 109 and one or more connections 119 between the one or more networks 109 and the reference repository 113.

In one or more embodiments, while FIG. 1 shows the server 102 connected directly to the one or more networks 109 via the one or more connections 110, the server 102 may be located inside one of the networks 109 as part of one or more of the network components (e.g., not shown). Further, while FIG. 1 shows the reference repository 113 connected directly to the one or more networks 109 via the one or more connections 117, the reference repository 113 may be located inside one of the networks 109 as part of one or more of the network components (e.g., not shown). While FIG. 1 shows the OEM-controlled system 115 connected directly to the one or more networks 109 via the one or more connections 119, the OEM-controlled system 115 may be located inside one of the networks 109 as part of one or more of the network components (e.g., not shown).

In some embodiments, the assessment environments 108 may be a physical location and/or a testing stage comprising less or more of the devices and/or elements shown in the communication system 100 of FIG. 1. For example, an assessment environment 108*a* be a testing building comprising every device and/or element shown in the communication system 100 of FIG. 1 where one or more performance aspects of specific communication devices may be evaluated.

In one or more embodiments, the communication system 100 comprises the user equipment 112, the one or more networks 109, the reference repository 113, the OEM-controlled system 115, and the server 102. In some embodiments, the communication system 100 may comprise a Fifth Generation (5G) mobile network or wireless communication system, utilizing high frequency bands (e.g., 24 Gigahertz (GHz), 39 GHz, and the like) or lower frequency bands such (e.g., frequency range FR1 Sub 6 GHZ-less than 7.125 GHZ). In this regard, the communication system 100 may comprise a large number of antennas. In some embodiments, the communication system may perform one or more communication operations associated with 5G New Radio (NR) protocols described in reference to the Third Generation Partnership Project (3GPP). As part of the 5G NR protocols, the communication system 100 may perform one or more millimeter (mm) wave technology operations to improve bandwidth or latency in wireless communications.

In some embodiments, the communication system 100 may be configured to partially or completely enable communications via one or more various radio access technologies (RATs), wireless communication technologies, or telecommunication standards, such as Global System for Mobiles (GSM) (e.g., Second Generation (2G) mobile networks), Universal Mobile Telecommunications System (UMTS) (e.g., Third Generation (3G) mobile networks), Long Term Evolution (LTE) of mobile networks, LTE-Advanced (LTE-A) mobile networks, 5G NR mobile networks, or Sixth Generation (6G) mobile networks.

Communication System Components

Server

The server 102 is generally any device or apparatus that is configured to process data and communicate with the networks 109, the user equipment 112, the reference repository 113, and the OEM-controlled system 115. The server 102 may be configured to monitor, track data, control routing of signals, and control operations of certain electronic components in the communication system 100, associated databases, associated systems, and the like, via one or more interfaces. The server 102 is generally configured to oversee operations of a server processor 120 comprising a server processing engine (not shown). The operations of the server processing engine are described further below. In some embodiments, the server 102 comprises the server processor 120, one or more server Input (I)/Output (O) interfaces 124, one or more databases 126, and a server memory 130 communicatively coupled to one another. The server 102 may be configured as shown, or in any other configuration.

The server processor 120 may comprise one or more processors operably coupled to and in signal communication with the one or more server I/O interfaces 124, the databases 126, and the server memory 130. The server processor 120 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 120 may be a programmable logic device, a microcontroller, a microprocessor, or any suitable combination of the preceding. The one or more processors in the server processor 120 are configured to process data and may be implemented in hardware or software executed by hardware. For example, the server processor 120 may be an 8-bit, a 16-bit, a 32-bit, a 64-bit, or any other suitable architecture. The server processor 120 may comprise an arithmetic logic unit (ALU) to perform arithmetic and logic operations, processor registers that supply operands to the ALU, and store the results of ALU operations, and a control unit that fetches software instructions such as server instructions 132 from the server memory 130 and executes the server instructions 132 by directing the coordinated operations of the ALU, registers and other components via the server processing engine. The server processor 120 may be configured to execute various instructions. For example, the server processor 120 may be configured to execute the server instructions 132 to perform functions or perform operations disclosed herein, such as some or all of those described in FIGS. 1-9. In some embodiments, the functions described herein are implemented using logic units, FPGAs, ASICs, DSPs, or any other suitable hardware or electronic circuitry.

In some embodiments, the server processor 120 may be configured to perform one or more data exchange operations and one or more reporting operations simultaneously, sequentially, or in combination. The server processor 120 may be configured to alternate between the data exchange operations and the reporting operations in real-time. In some embodiments, "real-time" may refer to immediate or near immediate (e.g., within one or two seconds) change of operations. For example, an operation B may be considered to occur in real-time response to an operation A in a case where operation B occurs within a second after operation A. In other embodiments, "real-time" may refer to operations that occur in immediate response to triggering operations even in cases where responding operations occur several minutes after triggering operations.

In one or more embodiments, the server I/O interfaces 124 may be hardware configured to enable one or more operations 210-246 described in reference to FIG. 2, one or more operations 302-336 described in reference to FIG. 3, one or more operations 410-448 described in reference to FIG. 4, one or more operations 502-536 described in reference to FIG. 5, one or more operations 610-638 described in reference to FIG. 6, one or more operations 702-762 described in reference to FIG. 7, one or more operations 810-842 described in reference to FIG. 8, and one or more banner operations 902-932 described in reference to FIG. 9. The server I/O interfaces 124 may comprise one or more antennas as part of a transceiver, a receiver, or a transmitter for communicating using one or more wireless communication protocols or technologies. In some embodiments, the server I/O interfaces 124 may be configured to communicate using, for example, NR or LTE using at least some shared radio components. In other embodiments, the server I/O interfaces 124 may be configured to communicate using single or shared radio frequency (RF) bands. The RF bands may be coupled to a single antenna, or may be coupled to multiple antennas (e.g., for a multiple-input multiple output (MIMO) configuration) to perform wireless communications.

The server I/O interfaces 124 may be configured to comprise one or more peripherals such as a network interface, one or more administrator interfaces, and one or more displays. The server network interfaces that may be part of the server I/O interfaces 124 may be any suitable hardware or software (e.g., executed by hardware) to facilitate any suitable type of communication in wireless or wired connections. These connections may comprise, but not be limited to, all or a portion of network connections coupled to additional network components in a core network, the user equipment 112, the Internet, an Intranet, a private network, a public network, a peer-to-peer network, the public switched telephone network, a cellular network, a local area network (LAN), a metropolitan area network (MAN), a wide area network (WAN), and a satellite network. The server network interface may be configured to support any suitable type of communication protocol.

The one or more administrator interfaces may be part of the server I/O interfaces 124 may be user interfaces configured to provide access and control to of the server 102 to one or more users (e.g., the user 116) or electronic devices. The one or more users may access the server memory 130 upon confirming one or more access credentials (e.g., a user profile) to demonstrate that access or control to the server 102 may be modified. In some embodiments, the one or more administrator interfaces may be configured to provide hardware and software resources to the one or more users. Examples of user devices comprise, but are not limited to, a laptop, a computer, a smartphone, a tablet, a smart device, an Internet-of-Things (IoT) device, a simulated reality device, an augmented reality device, or any other suitable type of device. The administrator interfaces may enable access to one or more graphical user interfaces (GUIs) via an image generator display (e.g., one or more displays), a touchscreen, a touchpad, multiple keys, multiple buttons, a mouse, or any other suitable type of hardware that allow users to view data or to provide inputs into the server 102. The server 102 may be configured to allow users to send requests to one or more user equipment 112.

In the example of FIG. 1, the one or more displays that may be part of the server I/O interfaces 124 may be configured to display a two-dimensional (2D) or three-dimensional (3D) representation of a service. Examples of the representations may comprise, but are not limited to, a graphical or simulated representation of an application, diagram, tables, or any other suitable type of data information or representation. In some embodiments, the one or more displays may be configured to present visual information to one or more users (not shown). The one or more displays may be configured to present visual information to the one or more users updated in real-time. The one or more displays may be a wearable optical display (e.g., glasses or a head-mounted display (HMD)) configured to reflect projected images and enable user to see between the one or more displays. For example, the one or more displays may comprise display units, one or more lenses, one or more semi-transparent mirrors embedded in an eye glass structure, a visor structure, or a helmet structure. Examples of display units comprise, but are not limited to, a cathode ray tube (CRT) display, a liquid crystal display (LCD), a liquid crystal on silicon (LCOS) display, a light emitting diode (LED) display, an organic LED (OLED) display, an active-matrix OLED (AMOLED) display, a projector display, or any other suitable type of display. In another embodiment, the one or more displays are a graphical display on the server 102. For example, the graphical display may be a tablet display, or a smartphone display configured to display the data representations.

The databases 126 may be configured to provide one or more memory resources to the server 102 and/or the user equipment 112. In one or more embodiments, the databases 126 are configured to store data that enables the server 102 to configure, manage and coordinate operations in one or more network components (e.g., managed servers). In some embodiments, the databases 126 store data used by the server 102 to operate as a halfway point in between the network components and other tools or databases. While the databases 126 are shown to be located within the server 102 in FIG. 1, the databases 126 may be located in the server 102 and/or at a distance from the server 102.

In one or more embodiments, the one or more server I/O interfaces 124 may comprise a data aggregator. The data aggregator may be hardware and/or software executed by hardware configured to encrypt and/or encode data comprising multiple data formats. In this regard the data aggregator may be configured as an encoder to convert data from one format into a coded format. The data aggregator may be configured to perform multiple layers (e.g., levels of encryption) of the information stored in the databases 126 and/or the server memory 130. In some embodiments, the data aggregator may be configured to decrypt and/or decode data comprising multiple data formats. In this regard, the data aggregator may be configured as a decoder to convert data from one format into a decoded format. The data aggregator may be configured to perform multiple layers (e.g., levels of decryption) of the information stored in the databases 126 and/or the server memory 130. The data aggregator may be configured with updates dynamically and/or periodically over time. The data aggregator may be configured over time or preconfigured via one or more rules and policies.

The server memory 130 may be volatile or non-volatile and may comprise a read-only memory (ROM), random-access memory (RAM), ternary content-addressable memory (TCAM), dynamic random-access memory (DRAM), and static random-access memory (SRAM). The server memory 130 may be implemented using one or more disks, tape drives, solid-state drives, and/or the like. The server memory 130 is operable to store one or more server instructions 132, one or more evaluation operations 103, one or more integration operations 104, one or more retrieval operations 105, installation operations 106, one or more assessment operations 107, one or more assessment environments 108, one or more access commands 133, one or more control operations 134, communication device information 136 comprising a manufacture year 137 and a model 138 associated with one or more communication devices, one or more test results 139, one or more original equipment manufacturer (OEM) directories comprising one or more OEM profiles 141, one or more reports 142 comprising one or more information depictions 143, one or more tolerance ranges 144, one or more feedback performance parameters 145, one or more target performance parameters 146, one or more configuration conflicts 147, one or more target results 148, one or more priority tiers 149, one or more scripts 150, one or more release triggers 152, one or more wires and/or wireless communication operations 153, one or more release versions 154 of one or more services 155 comprising one or more processing formats 156, and one or more system parameters 157. In the server memory 130, the server instructions 132 may comprise commands and controls for operating one or more specific network functions (NFs) in the one or more networks 109 when executed by the server processing engine of the server processor 120. The server processing engine may be configured to operate as a session border controller configured to execute the one or more server instructions 132, perform the one or more evaluation operations 103, perform the one or more integration operations 104, perform the one or more retrieval operations 105, perform the one or more installation operations 106, perform the one or more assessment operations 107, perform the one or more control operations 134, and/or perform the one or more communication operations 153.

In one or more embodiments, the server 102 is configured to improve certification operations performed in one or mor assessment environments 108. The server 102 may be configured to reduce resource (e.g., processing resources, memory resources, and/or power resources) usage as the server 102 performs certification operations, firmware updates, anomaly tracking, and service (e.g., application) release management operations. Herein, the server 102 may be configured to reduce, inhibit, and/or eliminate user intervention and errors introduced by manually modifying certification operations. The server 102 may be configured to accurately simulate real user interactions, leading to more complete testing and reliable feedback, automatically monitoring for new software builds and issues reducing installation delays and updating communication devices with the latest firmware and promptly addressing possible determined adverse impacts. The server 102 is further configured to integrate operations between different systems for anomaly tracking, software management, and testing to increase efficiencies and reduce information silos.

In one or more embodiments, the server 102 may be configured to addresses key challenges currently faced in certification operations, firmware management, anomaly tracking, and testing. By automating and streamlining these processes, the server 102 enhances efficiency, scalability, accuracy, and reliability of certification operations, ultimately leading to better certification quality and an improved user experience after communication devices are approved to perform connect to a communication network. In some embodiments, the server 102 may be configured to increase efficiency of certification operations by automating issue tracking, service release management, firmware updates, and testing operations, which significantly reduces the time and/or resource usage in the communication system 100. Further, the server 102 may be configured to enhanced scalability of certification operations by dynamically handling increased workloads in the communication system 100 without spending extensive additional resources. This is particularly important in communication networks comprising several (e.g., hundreds of thousands, millions) that are expected to perform in accordance with one or more communication standards. The server 102 is configured to improve accuracy and reliability of certification operations by automating continuous monitoring and real-time notifications to ensure that communication devices are always running the latest software and that installation and/or performance issues are addressed promptly. This approach inhibits, reduces, and/or eliminates downtime during certification operations. The server 102 may be configured to streamlined certification processes by integrating different systems into a cohesive workflow to inhibit, reduce, and/or eliminate information silos and improve coordination between various stages of service management. This results in a more streamlined and efficient certification process overall.

The one or more evaluation operations 103 may be one or more operations in which user equipment (UE) parameters 197 are evaluated on one or more communication devices (e.g., user equipment 112*a*). The evaluation operations 103 may be triggered by the server 102 and/or another communication device. The communication devices may be one or more of the user equipment 112 configured to report feedback comprising one or more tests results 139 and/or one or more feedback performance operations. In some embodiments, the evaluation operations 103 may comprise one or more hardware testing operations configured to evaluate one or more UE parameters 197 (e.g., one or more performance parameters associated with a specific user equipment 112) in one or more communication devices.

The one or more integration operations 104 may be one or more operations in which one or more operational system parameters 157 associated with an operating system (OS) and/or a service 155 (e.g., applications) are programmed in one or more communication devices (e.g., user equipment 112). The operational system parameters 157 may be one or more parameters and/or configuration commands configured to install a specific OS and/or a specific service 155 in the one or more communication devices. After installing the OS and/or the one or more services 155 in the communication devices, the communication devices may be configured to perform one or more specific communication operations 153 associated with the specific OS and/or one or more specific services 155. Installation of the operational system parameters 157 may be performed in an assessment environment 108 where the installation of the OS and performance of the communication devices while executing the one or more wireless communication operations may be evaluated. Herein, while the OS and the one or more services 155 are mentioned separately, descriptions of operations (e.g., installation, analysis and the like) for the services 155 may refer to operations that may be performed in association with the OS.

The one or more retrieval operations 105 may be one or more operations in which one or more system parameters 157 associated with an OS and/or a service 155 (e.g., applications) are retrieved from one or more OEM-controlled systems 115 to be installed in one or more communication devices (e.g., user equipment 112). The operational system parameters 157 may be one or more parameters configured to install a specific OS and/or a specific service 155 in the one or more communication devices. After installing the OS and/or the one or more services 155 in the communication devices, the communication devices may be configured to perform one or more specific communication operations 153 associated with the specific OS and/or one or more specific services 155.

The one or more installation operations 106 may be one or more operations in which the one or more operational system parameters 157 are installed as part of an OS build and/or a service build in one or more communication devices. Further, the one or more installation operations may configure the OS and/or the one or more services 155 to perform one or more specific wireless communication operations 153. The installation operations may be configured to configure a newly installed build of a specific OS and/or a specific service 155 on a specific communication device and/or to reconfigure a previously installed build of the specific OS and/or the specific service 155 in the specific communication device. Installation of the operational system parameters 157 may be performed in an assessment environment 108 where the installation of the OS and performance of the communication devices while executing the one or more wireless communication operations 153 may be evaluated.

The one or more assessment operations 107 may be one or more operations in which one or more assessment reports 142 are generated to report one or more tests results 139. The test results 139 may be feedback obtained from one or more communication devices after one or more communication operations 153 are performed. The test results 139 may comprise one or more feedback performance parameters 145 referencing performance of one or more UE parameters 197 at one or more specific communication devices. The assessment operations 107 may be configured to evaluate the test results 139 received from the communication devices and report one or more analyses of the test results 139 to a manufacturer (e.g., OEM) of the communication devices. Herein, the reports 142 may comprise a predefined format determined by a certification entity (e.g., a communication carrier and/or an entity configured to provide connectivity between communication devices and communication networks) and/or the manufacturer of a specific communication device. The reports 142 may be generated and transmitted to the manufactured via a wired and/or wireless communication in accordance with a specific reporting format determined by the certification entity and/or the certification entity.

The one or more assessment environments 108 may be one or more physical locations and/or stages of testing and/or evaluating in which production analysis is performed on some, or all, software and/or hardware elements of communication devices to obtain a technical approval. The technical approval may reference that one or more communication devices are allowed to connect with one or more communication networks in accordance with one or more communication standards. Further, a technical approval of a specific communication device may be a results-driven certification and/or documentation referencing that the specific communication device is approved to establish one or more communication links with a communication network via a certification entity (e.g., a communication carrier and/or an entity configured to provide connectivity between communication devices and communication networks). In some embodiments, the technical approval references that the specific communication device comprises up-to-date builds of software applications and/or peripherals and/or interfaces (e.g., sensors, processor, memory, and other electronic components). The technical approval may reference that the specific communication device meets a compliance standard set forth by an organization that manufactured some, or all, of the specific communication device and/or a compliance standard set forth by an organization that facilitates some, or all, operations performed by the specific communication device.

The one or more access commands 133 may be configured to establish one or more communication sessions between the server 102 and one or more user equipment 112. The access commands 133 may be configured to establish one or more communication sessions between the one or more user equipment 112. Each configuration command of the access commands 133 may be used to establish a communication session between a given network component of one or more network components in the communication network, the server 102, and/or user equipment 112. The access commands 133 may be routing and configuration information for reinstating and/or reestablishing communication sessions when a change is detected in the operations of the communication system 100. For example, in response to losing a specific communication session established with a first access command, the server 102 may attempt to reinstate the specific communication session based at least in part upon a second access command. The access commands 133 may be dynamically or periodically updated from network components in a core network. Herein, communication sessions refer to communication signals exchanged between the server 102 and additional network components in the core network. In some embodiments, the access commands 133 are provided to the server 102 from another of the network components performing a specific network function (NF). The access commands 133 may be configured to enable access of the one or more services 155. The access commands 133 may be configured to facilitate access to network resources (e.g., processing resources, memory resources, and/or power resources) in the communication network.

In one or more embodiments, the access commands 133 may be a communication or a message configured to indicate a request for access of an application (via an Application Programing Interface (API)) or a service 155. In some embodiments, the access commands 133 may be a communication or a message configured to enable access to one or more entitlements in an application (via an API) or a service 155. The entitlements may be configured to provide one or more connectivity allowances (e.g., access) between the server 102, the user equipment 112, and the one or more of the network components. The entitlements may be assigned to specific departments or tenants. The entitlements may be predefined or dynamically defined in accordance with one or more rules and policies. The access commands 133 may comprise guidance for performing one or more certification operations. In some embodiments, the certification operations may comprise the one or more installation operations 106, the one or more assessment operations 107, the one or more control operations 134, and/or the one or more communication operations 153. In some embodiments, the access commands 133 may be configured to guide one or more hardware testing operations in one or more communication devices. The access commands 133 may comprise guidelines to establish one or more communication links 114.

The one or more control operations 134 may be configured to control usage is specific resources in the communication devices. The one or more control operations 134 may be part of the hardware testing operations as described in the evaluation operations 103. The one or more control operations 134 may comprise peripheral control operations, processor control operations, memory control operations, and/or power control operations among others. The peripheral control operations may be configured to evaluate movement and selections in a peripheral (e.g., one or more of the UE input (I)/output (O) interfaces 191) of the communication device while performing one or more communication operations 153. For example, the peripheral control operations may be configured to evaluate what is shown in a display peripheral while monitoring and/or tracking performance parameters and/or usage of processing resources, memory resources, and/or power resources. The memory control operations may be configured to evaluate memory usage in the communication device while performing one or more communication operations 153. The processor control operations may be configured to evaluate processor usage in the communication device while performing one or more communication operations 153. The processor control operations may be configured to evaluate processor usage in the communication device while performing one or more communication operations 153. The power control operations may be configured to evaluate power usage and/or consumption in the communication device while performing one or more communication operations 153.

The communication device information 136 may be information that is specific to a communication device. The communication device information 136 may reference a manufacture year 137 and/or a model 138. The manufacture year 137 may comprise a year value or a value that is representative of a year value in which the specific communication device was manufacturer and/or released for testing and/or certification. The model 138 may be a string of data, an alphanumeric list, and/or one or more reference numbers among others. The communication device information 136 may be information representative of one or more communication devices that share a common capability. The communication device information 136 may reference one or more communication types. For example, the communication device information 136 may reference that one or more communication devices are computer devices, Internet-of-Things devices, satellite-enabled devices, and the like.

The one or more test results 139 may be one or more analyses results from one or more certification operations. The test results 139 may comprise analyses results from one or more feedback performance parameters 145 received as part of one or more certification operations. For example, in a case where one or more evaluation operations 103 evaluate performance of a peripheral display on a given communication device, certain feedback performance parameters 145 may comprise raw data indicating changes on performance parameters that are specific to the communication device. These performance parameters may be resolution luminosity, and/or brightness on the peripheral display over a time duration. As the feedback performance parameters 145 are received, the feedback performance parameters 145 may be compared against one or more corresponding target performance parameters 146. Herein, the server 102 may be configured to determine patterns and/or behavior correlations between one or more of the feedback performance parameters 146 and one or more changes of the feedback performance parameters 145 over time. The test results 139 may be the results of those determination and comparisons.

In one or more embodiments, the test results 139 may reference changes of one or more performance parameters in the user equipment 112 over a period of time. The test results 139 may comprise one or more peripheral test results **139*a* that reference changes to a first subset of the performance parameters associated with movement and selections in a peripheral of the communication device while performing one or more communication operations 153 over the period of time. The test results 139 may comprise one or more memory test results 139*b* referencing changes to a second subset of the performance parameters associated with memory usage in the communication device while performing one or more communication operations 153 over the period of time. The test results 139 may comprise one or more processor test results 139*c* referencing changes to a third subset of the performance parameters associated with processor usage in the communication device while performing the communication operations 153 over the period of time. The test results 139 may comprise one or more power test results 139*d* referencing changes to a fourth subset of the performance parameters associated with power usage and/or consumption in the communication device while performing the communication operations 153** over the period of time. Herein, one or more of the first subset, the second subset, the third subset, and the fourth subset may comprise at least some overlapping performance parameters. For example, a performance parameter that tracks foveation in a portion of a display may be associated with both processor usage and power consumption in the communication device.

In one or more embodiments, the server 102 may be configured to correlate the test results 139*a*-139*d* to one another in accordance with one or more specific certification operations. For example, the server 102 may be configured to correlate one or more of the peripheral test results 139*a* to one or more of the memory test results 139*b* and/or the processor test results 139*c* for each timestamp in the period of time. The server 102 may be configured to generate a report 142*a* comprising a visual depiction 143*a* of a correlation of the peripheral test results 139*a*, the memory test results 139*b*, and the processor test results 139*c* over the period of time.

The one or more OEM directories 140 may comprise multiple OEM profiles 141 indicating information associated with one or more OEMs. The OEM profiles 141 may comprise multiple indicators referencing historic data of a given OEM. The historic data may comprise previous manufacture orders, manufacturer information to access one or more OEM-controlled systems associated with a specific OEM, and/or proposal responses associated with the given OEM.

The one or more reports 142 may be one or more documents, files, and/or information comprising text data and/or image data. The reports 142 may be one or more data elements comprising one or more of the test results 139 in association with one or more communication device information 136. The reports 142 may comprise one or more depictions 143. The depictions 143 may be visual depictions 143*a*, audio depictions 143*b*, and the like. The server 102 may be configured to generate a report 142 referencing that one or more certification operations were completed within the time period. In one or more embodiments, the server 102 may be configured to transmit the reports to one or more recipients. The recipients may be alphanumeric data, reference tables, and/or indicators configured to show one or more devices configured to receive information from the server 102. The recipients may be one or more OEMs, one or more user equipment 112, and/or other servers communicatively coupled to the server 102 via the network 109. The one or more depictions 143 may be shown in accordance with one or more representation parameters (not shown). The representation parameters may be one or more configuration commands configured to indicate changes and/or modifications to one or more depictions 143. The reports 142 may comprise data indicating warnings and/or alerts among other information. In some embodiments, the reports 142 may be audio and/or visual signaling presented in the one or more server I/O interfaces 124 and/or the one or more UE I/O interfaces 191.

The one or more tolerance ranges 144 may be one or more threshold values and/or threshold range values. The tolerance ranges 144 may be one or more specific numbers and/or number ranges associated with a specific parameter and/or indicator. The tolerance ranges 144 may be a specific value representing a higher boundary or a lower boundary. The tolerance ranges 144 may be one or more threshold ranges comprising higher boundaries and lower boundaries. In one or more embodiments, the tolerance ranges 144 may be a percentage value representing a similarity and/or a difference between one or more feedback performance parameters 145 and one or more target performance parameters 146. In some embodiments, the tolerance ranges 144 may incorporate the target performance parameters 146 such that specific feedback performance parameters 145 matching a specific tolerance range 144 represents that the feedback performance parameters 145 are within a predefined tolerance and/or error with respect to the one or more target performance parameters 146. In some embodiments, the tolerance ranges 144 may incorporate the target performance parameters 146 such that specific feedback performance parameters 145 that do not match the specific tolerance range 144 represents that the feedback performance parameters 145 are not within the predefined tolerance and/or error with respect to the one or more target performance values. The tolerance range 144 may be determined based on information associated with one or more certification operations exchanged between the server 102, the one or more user equipment 112, the one or more reference repositories 113, and/or the one or more OEM-controlled systems 115. The tolerance range 144 may be determined dynamically over time. The tolerance range 144 may be predefined and/or predetermined in accordance with information in activity associated with one or more of the certification operations. In some embodiments, the server 102 may be configured to calculate the tolerance range 144 based on information obtained via the server I/O interfaces 124.

The one or more feedback performance parameters 145 may be feedback received and/or obtained by the server 102 in association with performance of one or more UE parameters 197. The feedback performance parameters 145 may be configured to reference behavior patterns associated with one or more peripherals of a given user equipment 112. The one or more feedback performance parameters 145 comprising feedback received periodically over time. The one or more feedback performance parameters 145 comprising feedback received in real time from one or more user equipment 112. The feedback performance parameters 145 may be configured in accordance with one or more of the processing formats 156. The feedback performance parameters 145 may be configured to reference one or more service configurations in the user equipment 112 as one or more communication operations 153 are performed.

The one or more target performance parameters 146 may be one or more reference performance parameters referencing one or more optimal patterns and/or behaviors associated with operations performed by one or more of the peripherals of the user equipment 112. The target performance parameters 146 may be configured as expected performance of one or more UE parameters 197 for a specific user equipment 112. The server 102 may be configured to retrieve the one or more target performance parameters 146 to compare against one or more collected feedback performance parameters 145. The target performance parameters 146 may be one or more values and/or functions indicating an optimal, ideal, and/or expected performance of the communication devices as these devices perform one or more specific communication operations 153.

The one or more configuration conflicts 147 may be one or more conflicts between one or more configurations of one or more services 155 prior to installing the service 155 into one or more communication operations. Herein, conflicts may be any potential for adverse impacts in the communication system 100 as a result of one or more certification operations. The conflicts may be one or more determinations that one or more services 155 installed, or to be installed, in a given communication device. The server 102 may be configured to perform one or more evaluation operations 103 on services 155 that are installed and/or prepared to be installed in a given communication device. The server 102 may be configured to perform one or more evaluation operations 103 on new releases of existing configuration of services 155 installed in a given communication device. For example, the server 102 may be configured to determine whether there are any configuration conflicts 147 that may cause any possible adverse effects on performance of a communication device.

The one or more target results 148 may be one or more reference results referencing one or more optimal values associated with analyses of operations performed based on one or more target performance parameters 146. The target results 148 may be configured as expected results of one or more evaluations of specific target performance parameters 146 for a specific user equipment 112. The server 102 may be configured to retrieve the one or more target results 148 to compare against one or more determined test results 139. The target results 148 may be one or more values and/or functions indicating an optimal, ideal, and/or expected analyses results. In one or more embodiments, the server 102 may be configured to obtain multiple target results 148 referencing analyses of multiple target performance parameters 146 associated with movement and selections in one or more peripherals of a specific communication device while performing one or more communication operations over the period of time. Further, the server 102 may be configured to compare specific peripheral test results 139*a* to a corresponding target result 148*a*, determine whether the peripheral test result 139*a* is outside a tolerance range 144*a* from the corresponding target result 148*a*. In some embodiments, in response to determining that the peripheral test result 139*a* is outside the tolerance range 144*a* from the corresponding target result 148*a*, determine that an error occurred at a timestamp associated with the peripheral test result 139*a*, generate a proposed modification to the peripheral. The proposed modification may be configured to resolve the error.

The one or more priority tiers 149 may be one or more tiering guidelines associated with a priority order in which one or more certification operations may be performed. The priority tiers 149 may be determined by one or more certification organizations and/or the manufacturer of a specific communication device. In one or more embodiments, the server 102 may be configured to determine at least one priority tier 149 based on one or more certification operations performed. The priority tier 149 may comprise strict priorities or weighted priorities for one or more certification operations. Each priority tier 149 may correspond to an operation type of the one or more communication operations 153 that one or more communication parameters of the at least one communication device matching specific communication device information 136 are configured to trigger. The priority tiers 149 may be an order indicating a position of the certification operations in an architecture roadmap and/or operational flow. For example, a priority tier 149*a* may reference that a first certification operation may be performed before a second certification operation comprising a priority tier 149*b*. In another example, a priority tier 149*c* may reference that a third certification operation may be performed after the second certification operation and before a fourth certification operation comprising a priority tier 149*d*.

The one or more scripts 150 may be one or more sets of server instructions 132 configured to guide a sequence of operations in the communication system 100. The server 102 may be configured to execute one or more scripts 150 to sequentially trigger one or more certification operations in the communication system 100. The scripts 150 may be performed in series such that one script is performed after another over time. The scripts 150 may be performed in parallel such that multiple scripts are performed at over a same period of time.

The one or more release triggers 152 may be one or more triggers associated with one or more operations and/or services 155. In this regard, the release triggers 152 may be one or more triggering mechanisms configured to install (e.g., flash) a specific service 155 into one or more communication devices. For example, a release trigger 152*a* may be a mechanism in which a server 102 is configured to install a specific service 155 in a specific communication device upon determining that a specific communication operation 153 is to be performed in the specific communication device as part of the certification operations. The release triggers 152 may be one or more triggering mechanisms configured to install (e.g., flash) a specific release version 154 of a specific service 155 into one or more communication devices. For example, a release trigger 152*b* may be a mechanism in which a server 102 is configured to install a specific release version 154 of a specific service 155 in one or more specific communication device upon determining that one or more specific communication operations 153 are to be performed in the specific communication device as part of the certification operations.

The one or more communication operations 153 may be one or more wired and/or wireless data exchanges performed between two or more communication devices in the communication system 100. The communication devices may comprise the server 102, the one or more user equipment 112, the reference repository 113, and/or the OEM-controlled system 115 among others. In one or more embodiments, the communication operations 153 may be audio communications exchanged as part of audio conversations (e.g., during a telephonic call) between two or more communication devices. The communication operations 153 may be image and/or text communications exchanged as part of image-based conversations (e.g., during videocalls and/or chat exchanges) between two or more communication devices. The communication operations 153 may be signal communications exchanged as part of uplink/downlink operations between two or more communication devices. The one or communication operations 153 may be one or more operations executed by the server processor 120 configured to enable data objects to be exchanged between the server 102, the reference repository 113, the OEM-controlled system 115, and/or the one or more user equipment 112. In one or more embodiments, the communication operations 153 may be configured to reference one or more data objects to be exchanged between the server 102 and at least one of the user equipment 112 and/or between two or more user equipment 112. The server 102 may be configured to generate and analyze one or more communication operations 153. The server 102 may be configured to perform one or more operations to evaluate whether the communication operations 153 belong to a specific user equipment 112. The one or more communication operations 153 may be one, some, and/or all signaling exchanged between the server 102, one or more additional network components (e.g., nodes and routers among others), the reference repository 113, the OEM-controlled system 115, the one or more user equipment 112, and/or any other equipment and/or devices associated with the one or more networks 109. The communication operations 153 may be any control commands and/or signaling associated with transmissions and/or receptions of one or more communication devices in the communication system 100. The one or more communication operations 153 may be one or more data exchanges performed between two or more communication devices in the system 100. The communication devices may comprise the server 102, the reference repository 113, the OEM-controlled system 115, and/or one or more of the user equipment 112 among others. In one or more embodiments, the communication operations 153 may be audio communications exchanged as part of audio conversations (e.g., during a telephonic call) between two or more communication devices. The communication operations 153 may be image and/or text communications exchanged as part of image-based conversations (e.g., during videocalls and/or chat exchanges) between two or more communication devices. The communication operations 153 may comprise signals exchanged as part of uplink/downlink transmissions between two or more communication devices. The communication operations 153 may cause at least one peripheral in the server 102 and/or the user equipment 112 to modify one or more surrounding physical phenomena. For example, a communication operation **153*a*** comprising one or more uplink transmissions may comprise activation and/or actuation of an antenna to perform one or more electromagnetic waves to transmit uplink data.

The one or more release versions 154 of a given service 155 may be one or more builds associated with a given service 155 and/or OS. The release versions may comprise original release versions and/or updated release versions of the given service 155. In some embodiments, the server 102 may be configured to monitor, store, and/or modify aspects of one or more builds associated with a given service 155. The release versions 154 of the services 155 may be configured to be partially or completely installed in a communication device.

The one or more processing formats 156 may be one or more formats associated with any of the data, release versions 154 of the services 155, and/or the communication operations 153 in the communication system. The processing formats 156 may be configured to comprise any formats that information is transformed from in one or more certification operations. The processing formats 156 may be configured to comprise any formats that information is transformed to in one or more certification operations, the processing formats 156 may be updated dynamically and/or periodically over time in accordance with one or more rules and policies associated with the certification organization, the server 102, and/or a given OEM.

Reference Repository

In one or more embodiments, the reference repository 113 may be any computing device configured to communicate with other devices, such as the server 102, other network components in the networks 109, the user equipment 112, the OEM-controlled system 115, databases, and the like in the communication system 100. The reference repository 113 may be one or more network components in the communication system 100. The reference repository 113 may be configured to perform specific functions and/or operations described herein and interact with one or more network components in the networks 109. Examples of the reference repository 113 comprise, but are not limited to, a database server, a computer, a datacenter comprising multiple databases and/or servers, one or more IoT devices, or any other suitable type of device.

In one or more embodiments, referring to the reference repository 113 as a non-limiting example, the reference repository 113 may comprise one or more repository I/O interfaces 170, a repository processor 171 configured to execute a repository processing engine (not shown), and a repository memory 172 comprising one or more repository instructions (not shown), and one or more reference service releases 173 comprising one or more localized formats 174.

The one or more repository I/O interfaces 170 may be any suitable hardware or software (e.g., executed by hardware) to facilitate any suitable type of communication in wireless or wired connections. These connections may comprise, but not be limited to, all or a portion of network connections coupled to additional network components in the networks 109, the Internet, an Intranet, a private network, a public network, a peer-to-peer network, the public switched telephone network, a cellular network, a local area network (LAN), a metropolitan area network (MAN), a wide area network (WAN), and a satellite network. The repository I/O interfaces 170 may be configured to support any suitable type of communication protocol. The repository I/O interfaces 170 may be hardware configured to perform one or more operations in the reference repository 113 upon execution of the server instructions 132 by the server processor 120. Further, the repository I/O interfaces 170 may be hardware configured to perform one or more operations upon execution of repository instructions (not shown) by the repository processor 171. The repository I/O interfaces 170 may comprise one or more antennas as part of a transceiver, a receiver, or a transmitter for communicating using one or more wireless communication protocols or technologies. In some embodiments, the repository I/O interfaces 170 may be configured to communicate using, for example, 5G NR or LTE using at least some shared radio components. In other embodiments, the repository I/O interfaces 170 may be configured to communicate using single or shared RF bands. The RF bands may be coupled to a single antenna, or may be coupled to multiple antennas (e.g., for a MIMO configuration) to perform wireless communications. In some embodiments, the reference repository 113 may comprise capabilities for voice communication, mobile broadband services (e.g., video streaming, navigation, and the like), or other types of applications. In this regard, the repository I/O interfaces 170 of the reference repository 113 may communicate using machine-to-machine (M2M) communication, such as machine-type communication (MTC), or another type of M2M communication.

In one or more embodiments, the repository I/O interfaces 170 may comprise one or more incoming communication operations, one or more incoming reports and/or one or more outgoing requests. The incoming communication operations may be some or all communication operations received at the reference repository 113. The one or more incoming reports may be one or more of reports 142 received at the reference repository 113. The incoming reports may be any data and/or information in the repository I/O interfaces 170 comprising text data and image data representative of the reports 142 generated by the server 102. The text data and/or the image data may be static or dynamic. The text data may comprise alphanumeric data strings organized in an organized and/or randomize appearance in the repository I/O interfaces 170. The image data may be representative of the entry forms presented in the repository I/O interfaces 170. For example, the image data may comprise information about videos or images shown in the repository I/O interfaces 170 via one or more services 155. The one or more outgoing requests may be one or more communications transmitted to the server 102, the OEM-controlled system 115, and/or the user equipment 112.

In some embodiments, the reference repository 113 is communicatively coupled to one or more of the networks 109 via one or more connections 117. The reference repository 113 may be a device with cellular communication capability such as a mobile phone, a hand-held device, a computer, a laptop, a tablet, a smart watch or other wearable device, or virtually any type of wireless device. The reference repository 113 may be a device with wired and/or wireless communication capabilities communication capability and configured to store one or more release versions 154. The reference repository 113 may be configured to store information in accordance with one or more processing formats 156. In some applications, the reference repository 113 may be referred to as a centralized database, endpoint, communication device, and/or terminal.

The repository processor 171 may comprise one or more processors operably coupled to and in signal communication with the repository I/O interfaces 170 and the repository memory 172. The repository processor 171 is any electronic circuitry, including, but not limited to, state machines, one or more CPU chips, logic units, cores (e.g., a multi-core processor), FPGAs, ASICs, or DSPs. The repository processor 171 may be a programmable logic device, a microcontroller, a microprocessor, or any suitable combination of the preceding. The one or more processors in the repository processor 171 may be configured to process data and may be implemented in hardware or software executed by hardware. For example, the repository processor 171 may be an 8-bit, a 16-bit, a 32-bit, a 64-bit, or any other suitable architecture. The repository processor 171 comprises an ALU to perform arithmetic and logic operations, processor registers that supply operands to the ALU, and store the results of ALU operations, and a control unit that fetches software instructions such as the repository instructions from the repository processor 171 and executes the repository instructions by directing the coordinated operations of the ALU, registers, and other components via a repository processing engine (not shown). The repository processor 171 may be configured to execute various instructions. For example, the repository processor 171 may be configured to execute the repository instructions to implement functions or perform operations disclosed herein, such as some or all of those described in FIGS. 1-9. In some embodiments, the functions described herein are implemented using logic units, FPGAs, ASICs, DSPs, or any other suitable hardware or electronic circuitry.

In some embodiments, the repository memory 172 may be configured to store, index, and/or reference the one or more reference service releases 173. Each of the reference service releases 173 may comprise corresponding localized formats 174. The reference service releases 173 may be one or more release versions 154 of a given service 155 indexed to be referenced as part of one or more certification operations. For example, the reference service releases 173 may be one or more release versions 154 of a service 155 over a period of time. The reference service releases 173 may comprise one or more localized formats 174. The localized formats 174 may be one or more specific formats configured to streamline storage and/or retrieval of information from/to the reference repository 113. The reference service releases 173 may be one or more copies of one or more of the OEM service releases 186.

OEM-Controlled System

In one or more embodiments, the OEM-controlled system 115 may be any computing device configured to communicate with other devices, such as the server 102, other network components in the networks 109, the user equipment 112, the reference repository 113, databases, and the like in the communication system 100. The OEM-controlled system 115 may be one or more network components in the communication system 100. The OEM-controlled system 115 may be configured to perform specific functions and/or operations described herein and interact with one or more network components in the networks 109. Examples of the OEM-controlled system 115 comprise, but are not limited to, a database server, a computer, a datacenter comprising multiple databases and/or servers, one or more IoT devices, or any other suitable type of device.

In one or more embodiments, referring to the OEM-controlled system 115 as a non-limiting example, the OEM-controlled system 115 may comprise one or more OEM interfaces 180 comprising one or more credentials 181 and one or more server profiles 182, at least one system processor 183 configured to execute a system processing engine (not shown), and a system memory 184 comprising one or more system instructions (not shown), one or more communication guidelines 185, and one or more OEM service releases 186 comprising one or more predefined formats 187.

The one or more OEM interfaces 180 may be any suitable hardware or software (e.g., executed by hardware) to facilitate any suitable type of communication in wireless or wired connections. These connections may comprise, but not be limited to, all or a portion of network connections coupled to additional network components in the networks 109, the Internet, an Intranet, a private network, a public network, a peer-to-peer network, the public switched telephone network, a cellular network, a local area network (LAN), a metropolitan area network (MAN), a wide area network (WAN), and a satellite network. The OEM interfaces 180 may be configured to support any suitable type of communication protocol. The OEM interfaces 180 may be hardware configured to perform one or more operations in the OEM-controlled system 115 upon execution of the server instructions 132 by the server processor 120. Further, the OEM interfaces 180 may be hardware configured to perform one or more operations upon execution of system instructions (not shown) by the system processor 183. The OEM interfaces 180 may comprise one or more antennas as part of a transceiver, a receiver, or a transmitter for communicating using one or more wireless communication protocols or technologies. In some embodiments, the OEM interfaces 180 may be configured to communicate using, for example, 5G NR or LTE using at least some shared radio components. In other embodiments, the OEM interfaces 180 may be configured to communicate using single or shared RF bands. The RF bands may be coupled to a single antenna, or may be coupled to multiple antennas (e.g., for a MIMO configuration) to perform wireless communications. In some embodiments, the OEM-controlled system 115 may comprise capabilities for voice communication, mobile broadband services (e.g., video streaming, navigation, and the like), or other types of applications. In this regard, the OEM interfaces 180 of the OEM-controlled system 115 may communicate using machine-to-machine (M2M) communication, such as machine-type communication (MTC), or another type of M2M communication.

In one or more embodiments, the OEM interfaces 180 may comprise one or more incoming communication operations, one or more incoming reports and/or one or more outgoing requests. The incoming communication operations may be some or all communication operations received at the OEM-controlled system 115. The one or more incoming reports may be one or more of reports 142 received at the OEM-controlled system 115. The incoming reports may be any data and/or information in the OEM interfaces 180 comprising text data and image data representative of the reports 142 generated by the server 102. The text data and/or the image data may be static or dynamic. The text data may comprise alphanumeric data strings organized in an organized and/or randomize appearance in the OEM interfaces 180. The image data may be representative of the entry forms presented in the OEM interfaces 180. For example, the image data may comprise information about videos or images shown in the OEM interfaces 180 via one or more services 155. The one or more outgoing requests may be one or more communications transmitted to the server 102, the OEM-controlled system 115, and/or the user equipment 112. The credentials 181 may be one or more confirmation information configured to provide access to the server 102 into one or more OEM interfaces 180. The OEM interfaces 180 may be configured to provide an interactive interface where the server 102 may be configured to retrieve one or more information elements from the OEM-controlled system 115. The credentials 181 may be one or more information elements configured to enable the OEM-controlled system 115 to validate an identity of a server 102 attempting to interact with the OEM-controlled system 115, as saved in one or more server profiles 182. The OEM interfaces 180 may enable the server 102 to access one or more OEM service releases 186 of services 155 and/or OSs.

In some embodiments, the OEM-controlled system 115 is communicatively coupled to one or more of the networks 109 via one or more connections 119. The OEM-controlled system 115 may be a device with cellular communication capability such as a mobile phone, a hand-held device, a computer, a laptop, a tablet, a smart watch or other wearable device, or virtually any type of wireless device. The OEM-controlled system 115 may be a device with wired and/or wireless communication capabilities communication capability and configured to store one or more release versions 154. The OEM-controlled system 115 may be configured to store information in accordance with one or more predefined formats 187. In some applications, the OEM-controlled system 115 may be referred to as an OEM database, endpoint, communication device, and/or terminal.

The system processor 183 may comprise one or more processors operably coupled to and in signal communication with the OEM interfaces 180 and the system memory 184. The system processor 183 is any electronic circuitry, including, but not limited to, state machines, one or more CPU chips, logic units, cores (e.g., a multi-core processor), FPGAs, ASICs, or DSPs. The system processor 183 may be a programmable logic device, a microcontroller, a microprocessor, or any suitable combination of the preceding. The one or more processors in the system processor 183 may be configured to process data and may be implemented in hardware or software executed by hardware. For example, the system processor 183 may be an 8-bit, a 16-bit, a 32-bit, a 64-bit, or any other suitable architecture. The system processor 183 comprises an ALU to perform arithmetic and logic operations, processor registers that supply operands to the ALU, and store the results of ALU operations, and a control unit that fetches software instructions such as the system instructions from the system processor 183 and executes the system instructions by directing the coordinated operations of the ALU, registers, and other components via a system processing engine (not shown). The system processor 183 may be configured to execute various instructions. For example, the system processor 183 may be configured to execute the repository instructions to implement functions or perform operations disclosed herein, such as some or all of those described in FIGS. 1-9. In some embodiments, the functions described herein are implemented using logic units, FPGAs, ASICs, DSPs, or any other suitable hardware or electronic circuitry.

In one or more embodiments, the one or more communication guidelines 185 may be one or more commands instructing the server 102 on one or more approaches to perform the one or more retrieval operations 105. The communication guidelines 185 may be one or more requirements to access the one or more OEM service releases 186. In some embodiments, the server 102 may be configured to retrieve the communication guidelines 185 from a data retrieval interface comprised in the OEM interfaces 180. The OEM interfaces 180 may be one or more portals (e.g., webpage, database connection access, and/or I/O ports) from which OEM service releases 186 are accessed based on specific communication device information 136. The communication guidelines 185 may be retrieved periodically over time. The communication guidelines 185 may be retrieved dynamically in response to receiving one or more updates to the test results 139. In some embodiments, the system memory 184 may be configured to store, index, and/or reference the one or more OEM service releases 186. Each of the OEM service releases 186 may comprise corresponding predefined formats 187. The OEM service releases 186 may be one or more release versions 154 of a given service 155 indexed to be referenced as part of one or more certification operations. For example, the OEM service releases 186 may be one or more release versions 154 of a service 155 over a period of time. The OEM service releases 186 may comprise one or more predefined formats 187. The predefined formats 187 may be one or more specific formats configured to streamline storage and/or retrieval of information.

User Equipment

In one or more embodiments, each of the user equipment 112 (e.g., the user equipment 112*a* and a user equipment 112*g* representative of the user equipment 112*a*-112*g*) may be any computing device configured to communicate with other devices, such as the server 102, other network components in the networks 109, the reference repository 113, the OEM-controlled system 115, databases, and the like in the communication system 100. The user equipment 112 may be one or more network components in the communication system 100. Each of the user equipment 112 may be configured to perform specific functions described herein and interact with one or more network components in the networks 109. Examples of user equipment 112 comprise, but are not limited to, a laptop, a computer, a smartphone, a tablet, a smart device, an IoT device, a simulated reality device, an augmented reality device, or any other suitable type of device.

In one or more embodiments, referring to the user equipment 112*a* as a non-limiting example of the user equipment 112, the user equipment 112*a* may comprise a user equipment (UE) network interface 190, one or more UE I/O interfaces 191 comprising one or more incoming commands 192 and outgoing feedback 193, a UE processor 194 configured to execute a UE processing engine (not shown), and a UE memory 195 comprising one or more UE instructions 196, and one or more UE parameters 197.

The UE network interface 190 may be any suitable hardware or software (e.g., executed by hardware) to facilitate any suitable type of communication in wireless or wired connections. These connections may comprise, but not be limited to, all or a portion of network connections coupled to additional network components in the networks 109, the Internet, an Intranet, a private network, a public network, a peer-to-peer network, the public switched telephone network, a cellular network, a local area network (LAN), a metropolitan area network (MAN), a wide area network (WAN), and a satellite network. The UE network interface 190 may be configured to support any suitable type of communication protocol.

The UE I/O interfaces 191 may be hardware configured to perform one or more operations in the user equipment 112 upon execution of the server instructions 132 by the server processor 120. Further, the UE I/O interfaces 191 may be hardware configured to perform one or more operations upon execution of the UE instructions 196 by the UE processor 194. The UE I/O interfaces 191 may comprise one or more antennas as part of a transceiver, a receiver, or a transmitter for communicating using one or more wireless communication protocols or technologies. In some embodiments, the UE I/O interfaces 191 may be configured to communicate using, for example, 5G NR or LTE using at least some shared radio components. In other embodiments, the UE I/O interfaces 191 may be configured to communicate using single or shared RF bands. The RF bands may be coupled to a single antenna, or may be coupled to multiple antennas (e.g., for a MIMO configuration) to perform wireless communications. In some embodiments, the user equipment **112*a* may comprise capabilities for voice communication, mobile broadband services (e.g., video streaming, navigation, and the like), or other types of applications. In this regard, the UE I/O interfaces 191 of the user equipment 112*a*** may communicate using machine-to-machine (M2M) communication, such as machine-type communication (MTC), or another type of M2M communication.

In one or more embodiments, the UE I/O interfaces 191 may comprise one or more incoming communication operations, one or more incoming commands 192, and/or one or more outgoing feedback 193. The incoming communication operations may be some or all communication operations received at the user equipment **112*a*. The one or more incoming commands 192 may be one or more of reports 142 received from the server 102 at the user equipment 112*a*. The incoming commands 192 may be any data and/or information in the UE I/O interfaces 191 comprising text data and image data representative of the reports generated by the server 102. The text data and/or the image data may be static or dynamic. The text data may comprise alphanumeric data strings organized in an organized and/or randomize appearance in the UE I/O interfaces 191. The image data may be representative of the entry forms presented in the UE I/O interfaces 191. For example, the image data may comprise information about videos or images shown in the UE I/O interfaces 191 via services (e.g., user interface (UI) in applications). The one or more outgoing feedback 193 may be one or more feedback provided from the user equipment 112*a* to the server 102**.

In some embodiments, the user equipment **112*a* is communicatively coupled to one or more of the networks 109 via one or more communication links 114. The user equipment 112*a* may be a device with cellular communication capability such as a mobile phone, a hand-held device, a computer, a laptop, a tablet, a smart watch or other wearable device, or virtually any type of wireless device. In some applications, the user equipment 112** may be referred to as a UE, UE device, communication device, and/or terminal.

The UE processor 194 may comprise one or more processors operably coupled to and in signal communication with the UE network interface 190, the UE I/O interfaces 191, the UE processor 194, and the UE memory 195. The UE processor 194 is any electronic circuitry, including, but not limited to, state machines, one or more CPU chips, logic units, cores (e.g., a multi-core processor), FPGAs, ASICs, or DSPs. The UE processor 194 may be a programmable logic device, a microcontroller, a microprocessor, or any suitable combination of the preceding. The one or more processors in the UE processor 194 are configured to process data and may be implemented in hardware or software executed by hardware. For example, the UE processor 194 may be an 8-bit, a 16-bit, a 32-bit, a 64-bit, or any other suitable architecture. The UE processor 194 comprises an ALU to perform arithmetic and logic operations, processor registers that supply operands to the ALU, and store the results of ALU operations, and a control unit that fetches software instructions such as the UE instructions 196 from the UE memory 195 and executes the UE instructions 196 by directing the coordinated operations of the ALU, registers, and other components via the UE processing engine (not shown). The UE processor 194 may be configured to execute various instructions. For example, the UE processor 194 may be configured to execute the UE instructions 196 to implement functions or perform operations disclosed herein, such as some or all of those described in FIGS. 1-9. In some embodiments, the functions described herein are implemented using logic units, FPGAs, ASICs, DSPs, or any other suitable hardware or electronic circuitry.

In some embodiments, the UE parameters 197 may be one or more performance parameters evaluated at the user equipment **112*a*. The UE parameters 197 may be configured to change over time as communication operations 153 are performed in/at the user equipment 112*a* to generate at least a portion of the feedback communication parameters 145**.

Networks

The networks 109 may be a network configured to manage communication sessions for the user equipment 112. In one or more embodiments, the networks 109 may establish connections between user equipment 112 and the server 102 in accordance with one or more communication protocols. The networks 109 may be one or more interconnected networks 109 associated with one or more organizations. In this regard, the networks 109 may be configured to access resources associated to specific services in accordance with corresponding service directories. The networks 109 may comprise one or more network components (not shown) configured to perform one or more NFs. In some embodiments, the networks 109 may comprise a core network that enables the user equipment 112 to communicate with the server 102, or another type of device. The networks 109 may implement a communication method that does not require the establishment of a specific communication protocol connection between the user equipment 112 and one or more of the networks 109. The networks 109 may include one or more types of communication devices (not shown), which may perform different NFs.

In some embodiments, the networks 109 may comprise a 5G NR or an LTE access network (e.g., an evolved packet core (EPC) network) among others. In this regard, the networks 109 may comprise one or more logical networks implemented via wireless connections or wired connections. Each logical network may comprise an end-to-end virtual network with dedicated power, storage, or computation resources. Each logical network may be configured to perform a specific application comprising individual policies, rules, or priorities. Further, each logical network may be associated with a particular Quality of Service (QoS) class, type of service, or particular user associated with one or more of the user equipment 112. For example, a logical network may be a Mobile Private Network (MPN) configured for a particular organization. In this example, the user equipment 112*a* may be configured to connect to one or more particular network slices (i.e., logical networks) in the networks 109.

In the example system 100 of FIG. 1, the networks 109 may facilitate communication within the communication system 100. This disclosure contemplates that the networks 109 may be any suitable network operable to facilitate communication between the server 102 and the user equipment 112. The networks 109 may include any interconnecting system capable of transmitting audio, video, signals, data, messages, or any combination of the preceding. The networks 109 may include all or a portion of a LAN, a WAN, an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, and the like), a Long Term Evolution (LTE) network, a Universal Mobile Telecommunications System (UMTS) network, a peer-to-peer (P2P) network, a Bluetooth network, a Near Field Communication network, a Zigbee network, or any other suitable network, operable to facilitate communication between the components of the communication system 100. In other embodiments, the communication system 100 may not have all of these components or may comprise other elements instead of, or in addition to, those above.

Operation Flow to Automate Evaluation Operations In an Assessment Environment

FIG. 2 illustrates an example operation flow 200 implemented by the communication system 100 of FIG. 1, in accordance with one or more embodiments. The operation flow 200 may comprise one or more of the evaluation operations 103 described in reference to FIG. 1. While the operation flow 200 comprises multiple operations 210-246 are shown to be performed by the server 102, one or more of the user equipment 112, one or more parts of the reference repository 113, one or more parts of the OEM-controlled system 115, additional electronic devices or components in the server 102 (e.g., the server processor 120 in the server 102), in the user equipment 112 (e.g., the UE processor 194 in the user equipment 112*a*), or in the reference repository 113 (e.g., the repository I/O interfaces 170 in the reference repository 113) may be configured to perform one or more of the operations 210-246.

In one or more embodiments, the operational flow 200 is shown comprising the operations 210-246 performed by a user equipment 112*a*, a transaction interface 202, the server 102, and/or an access interface 204. The translation interface 202 may be one or more of the peripherals included in the server I/O interfaces 124 of the server 102 and/or one or more peripherals included in the UE I/O interfaces of the user equipment 112*a*. The access interface 204 may be one or more of the peripherals included in the server I/O interfaces 124 of the server 102, one or more peripherals included in the UE I/O interfaces of the user equipment 112*a*, and/or one or more OEM interfaces of the OEM-controlled system 115.

In one or more embodiments, the server 102 may be configured to evaluate performance of peripherals in user equipment 112 as part of one or more certification operations. The server 102 may be configured to reduce costs and setup complexity of certification operations while ensuring that testing processes are aligned with real user interactions and experiences. The server 102 may be configured to automate specific test plans and/or roadmaps comprising one or more evaluation operations 103 to be performed directly on communication devices. In some embodiments, the evaluation operations 103 are configured to replicate real user interactions in one or more peripherals of the communication device.

In one or more embodiments, the server 102 may be configured to prepare one or more of the user equipment 122 for automation by enabling developer tools. The server 102 may be configured to pre-compile one or more scripts 150 that generate one or more access commands 133 comprising one or more user experience (UX) and/or one or more user interface (UI) commands to interact with one or more peripherals in the user equipment 112. The server 102 may be configured to establish one or more mechanisms for logging feedback from the user equipment 112, such as screen recordings, UI values, and system logs.

In one or more embodiments, the server 102 may be configured to enable developer tools on user equipment 112 in preparation for automation. The server 102 may be configured to configure specific services 155 and corresponding release versions 154 in each of the user equipment 112 to be evaluated. The server 102 may be configured to install one or more services 155 in the user equipment 112 to perform one or more communication operation 153. The server 102 may be configured to load and start one or more scripts 150 configured to trigger one or more communication operations 153 in the user equipment 112 and/or one or more evaluation operations at the server 102. The server 102 may be configured to receive feedback performance parameters 145 from the user equipment 112 as one or more of the communication operations 153 are performed. The server 102 may be configured to evaluate the feedback performance parameters 145 to generate one or more test results 139.

The operational flow 200 may start at operation 210, where the user equipment 112*a* may be configured to establish and/or determine one or more performance parameters as part of one or more initiation operations where the user equipment 112*a* is started. In some embodiments, the user equipment 112*a* may be configured to determine one or more current performance parameters based on previously known performance parameters and/or previous feedback generated by the user equipment 112*a*. The performance parameters may be representative of one or more aspects of a peripheral that the server 102 is configured to evaluate over a period of time. At operation 214, the server 102 may be configured to initialize one or more evaluation operations 103 as part of one or more initiation processes. Herein, the server 102 may be configured to determine one or more aspects of the user equipment 112*a* to be evaluated. At operation 212, the user equipment 112*a* and the access interface 204 may be configured to enable developer tools at the user equipment 112*a*. The access interface 204 may be a peripheral of the user equipment 112*a* and/or the server 102 that provides access to configuration commands of the user equipment 112*a*. At operation 216, the user equipment may be configured to enable access and/or operability of one or more UE/I/O interfaces 191. At operation 218, the user equipment 112*a* may be configured to share with the translation interface 202 that the user equipment 112*a* is available to establish a communication link 114*a* with the server 102. In turn, at operation 220, the server 102 may be configured to inform the translation interface 202 that the server 102 is available to establish one or more communication links 114 with one or more user equipment 112. The user equipment 112*a* and the server 102 may be configured to inform one another directly that these network components are available to establish one or more communication links 114.

The operation flow 200 may continue at operations 222-234. At operation 222, the server 102 and the user equipment 112*a* may be configured to establish a communication link 114*a* directly and/or via the translation interface 202. In one or more embodiments, the translation interface 202 is an API located at the user equipment 112*a* and/or the server 102 that enables modification and/or visualization of specific configuration elements in the user equipment 112*a*. To establish the communication link 114*a*, the server 102 may be configured to broadcast connectivity information in an assessment environment 108. In turn, the user equipment 112*a* may be configured to receive the broadcasted connectivity information, parse connectivity commands from the connectivity information, and use the connectivity commands to provide a reply message to the server 102. At operation 224, the server 102 may be configured to determine one or more scripts 150 comprising pre-defined one or more evaluation operations 103 for automation. At operation 226, the server 102 and the translation interface 202 may be configured to execute the one or more scripts 150. The scripts 150 may be configured to automate one or more of the evaluation operations 103 in the user equipment 112*a*. At operation 228, the scripts 150 may trigger one or more communication operations 153 at the user equipment 112*a*. The user equipment 112*a* may be configured to perform one or more of the communication operations 153 triggered in response to executing the scripts 150. At operation 230, the user equipment 112*a* is configured to generate feedback comprising one or more changes to performance parameters for one or more peripherals over time. The server 102 may be configured to maintain ongoing communications with the user equipment 112*a* to trigger one or more of the evaluation operations 103. At operation 232, the user equipment 112*a* may be configured to transmit the feedback to the translation interface 202. At operation 234, the translation interface 202 may be configured to forward the feedback to the server 102. The translation interface 202 may be configured to receive unstructured data from the user equipment 112*a*, organize and structure the data in accordance with one or more models, and transmit a structured version of the feedback to the user equipment 112*a*.

The operation flow 200 may conclude at operations 240-246, where the server is configured to process the feedback received from the user equipment 112*a*. At operation 242, the server is configured to receive the feedback and analyze the received feedback. At operation 244, the server 102 is configured to generate a feedback report 142 comprising one or more analysis test results 139 comprising trends and/or patterns associated with changes observed in the performance parameters.

The operational flow 200 may conclude at operation 246, where the server 102 is configured to transmit the feedback report 142 to the access interface 204, which may be associated with the user equipment 112 and/or a reporting entity, such as the reference repository 113.

Example Process to Automate Evaluation Operations In an Assessment Environment

FIG. 3 illustrate respective example flowchart of the process 300, in accordance with one or more embodiments. Modifications, additions, or omissions may be made to the process 300. The process 300 may include more, fewer, or other operations than those shown in FIG. 3. For example, operations may be performed in parallel or in any suitable order. While at times discussed as performed by the server 102, one or more of the user equipment 112, one or more parts of the reference repository 113, one or more parts of the OEM-controlled system 115, components of any of thereof, or any suitable system or components of the communication system 100 may perform one or more operations of the process 300. For example, one or more operations of the process 300 may be implemented, at least in part, in the form of server instructions 132 of FIG. 1, stored on non-transitory, tangible, machine-readable media (e.g., server memory 130 of FIG. 1 operating as a non-transitory computer-readable medium) that when run by one or more processors (e.g., the server processor 120 of FIG. 1) may cause the one or more processors to perform operations described in operations 302-336.

In one or more embodiments, the process 300 may comprise automating testing of services 155 (e.g., applications, OS, and the like) in communication devices (e.g., any device with wired and/or wireless communication capabilities) during technical certification operations. The process 300 may be configured to prepare a communication device for testing, determine one or more evaluations/tests to perform in the communication devices using specific services 155, install (e.g., flash) these services 155 onto the communication devices, and implement one or more control operations 134 to perform the evaluations/tests. In some embodiments, the process 300 comprises evaluating user experience while collecting technical data from one or more peripherals in the communication devices. Herein, the process 300 identifies any errors (e.g., discrepancies) in the peripherals of the communication devices, while correlating these errors to technical aspects of the user equipment performance. In some embodiments, testing is done automatically upon determining testing parameters for a specific communication device.

The process 300 starts at operation 302, where the server 102 may be configured to establish a communication link 114*a* with a communication device (e.g., user equipment 112*a*) configured to perform one or more wired and/or wireless communication operations 153. At operation 304, the server 102 may be configured to determine one or more hardware testing operations (e.g., evaluation operations 103) configured to evaluate one or more performance parameters in the communication device. At operation 306, the server 102 may be configured to determine multiple services 155 based on the hardware testing operations. The server 102 may be configured to determine the services 155 based on the hardware testing operations (e.g., that may be used to perform the hardware testing operations). Each service 155 may be configured to evaluate one or more of the performance parameters. Further, each service 155 may be associated with one or more of the hardware testing operations. For example, the server 102 may be configured to use one or more services 155 to perform one or more of the hardware testing operations. In another example, the server 102 may be configured to use one of the services 155 to perform one or more of the hardware testing operations, at this stage, performing a hardware testing operation may refer to causing specific communication operations 153 to be performed at the communication device to evaluate one or more changes in performance parameters.

The process 300 continues at operation 310, where the server 102 may be configured to determine whether the one or more services 155 are already installed in the user equipment 112*a*. If the server 102 determines that the one or more services 155 are not already installed in the user equipment 112*a* (i.e., NO), the process 300 proceeds to operation 312. If the server 102 determines that the one or more services 155 are already installed in the user equipment 112*a* (i.e., YES), the process 300 proceeds to operation 312.

At operation 312, the server 102 is configured to install the services 155 at the communication device. At operation 314, the server 102 may be configured to determine one or more access commands 133 to guide the hardware testing operations in the communication device. The server 102 may be configured to determine the access commands 133 to guide the hardware testing operations in response to installing the services 155 into the communication device. At operation 316, the server 102 may be configured to trigger the communication device to perform the communication operations 153. At operation 318, the server 102 may be configured to perform the hardware testing operations on the communication device in accordance with the access commands 133. The server 102 may be configured to perform the hardware testing operations in the communication device in accordance with the access commands 133 in conjunction with triggering the communication device to perform the communication operations 153.

The process 300 continues at operation 320, where the server 102 may be configured to determine whether one or more errors are reported in logged feedback. If the server 102 determines that logged feedback does not comprise one or more errors (i.e., NO), the process 300 proceeds to operation 322. If the server 102 determines that logged feedback comprises one or more errors (i.e., YES), the process 300 proceeds to operation 332.

At operation 322, the server 102 may be configured to update the one or more access commands in accordance with the feedback errors. The process 300 may proceed to operation 316 after operation 322.

The process 300 may conclude at operations 332-336. In this case, the server 102 may be configured to determine and analyze parameters and/or trends that caused the feedback errors. At operation 332, the server 102 is configured to obtain feedback comprising changes in the performance parameters over a time at the communication device. The server 102 may be configured to obtain one or more target results 148 referencing multiple target performance parameters 146 associated with movement and selections in the peripheral of the communication device while performing one or more of the communication operations over the period of time, compare a peripheral test result 139*a* of the peripheral test results 139 to a corresponding target result 148*a* of the target results 148, determine whether the peripheral test result 139*a* is outside a tolerance range 144*a* from the corresponding target result 148*a*, and determine that an error occurred at a timestamp associated with the peripheral test result 139*a* in response to determining that the peripheral test result 139*a* is outside the tolerance range 144*a* from the corresponding target result 148*a*. At operation 334, the server 102 may be configured to determine proposed modifications to one or more communication device peripherals based on the feedback. The proposed modification may be configured to resolve the errors in the feedback. At operation 336, the server 102 may be configured to implement proposed modifications to the communication device peripherals.

In one or more embodiments, the hardware testing operations may comprise one or more control operations 134. The hardware testing operations may comprise one or more peripheral control operations 134*a* configured to evaluate movement and selections in a peripheral of the communication device while performing one or more of the communication operations 153, one or more memory control operations configured to evaluate memory usage in the communication device while performing one or more of the communication operations, and one or more processor control operations configured to evaluate processor usage in the communication device while performing the one or more communication operations. In some embodiments, the server 102 may be configured to obtain multiple test results 139 referencing changes in the performance parameters over a period of time. The test results 139 may comprise one or more peripheral test results 139*a* referencing changes to a first subset of the performance parameters associated with movement and selections in a peripheral of the communication device while performing the communication operations 153 over the period of time, one or more memory test results 139*b* referencing changes to a second subset of the performance parameters associated with memory usage in the communication device while performing the communication operations 153 over the period of time, and one or more processor test results 139*c* referencing changes to a third subset of the performance parameters associated with processor usage in the communication device while performing the communication operations 153 over the period of time.

In one or more embodiments, the server 102 may be configured to determine one or more timestamps in the period of time, correlate the peripheral test results 139*a* to the memory test results 139*b* and the processor test results 139*c* for each timestamp and generate a report 142 comprising a visual depiction 143*a* of a correlation of the peripheral test results 139*a*, the memory test results 139*b*, and the processor test results 139*c* over the period of time. In some embodiments, the server 102 may be configured to obtain one or more target results 148*a* referencing multiple target performance parameters 146*a* associated with movement and selections in the peripheral of the communication device while performing the communication operations over the period of time, compare a peripheral test result 139*a* to a corresponding target result 148*a*, determine whether the peripheral test result 139*a* is outside a tolerance range 144*a* from the corresponding target result 148*a*, determine that an error occurred at a timestamp associated with the peripheral test result 139*a* in response to determining that the peripheral test result 139*a* is outside the tolerance range 144*a* from the corresponding target result 148*a*, and generate a proposed modification to the peripheral. The proposed modification may be configured to resolve the error. The server 102 may be configured to generate one or more error feedback logs comprising the error and broadcast the one or more error feedback logs to an original equipment manufacturer (OEM) of the communication device. For example, the peripheral may be a screen in the communication device, and the one or more error feedback logs comprise the error and an image comprising image content shown on the screen at the timestamp.

Operation Flow to Integrate Operational System Parameters In Communication Devices In an Assessment Environment FIG. 4 illustrates an example operation flow 400 implemented by the communication system 100 of FIG. 1, in accordance with one or more embodiments. The operation flow 400 may comprise one or more of the integration operations 104 described in reference to FIG. 1. While the operation flow 400 comprises multiple operations 410-448 are shown to be performed by the server 102, one or more of the user equipment 112, one or more parts of the reference repository 113, one or more parts of the OEM-controlled system 115, additional electronic devices or components in the server 102 (e.g., the server processor 120 in the server 102), in the user equipment 112 (e.g., the UE processor 194 in the user equipment 112*a*), or in the reference repository 113 (e.g., the repository I/O interfaces 170 in the reference repository 113) may be configured to perform one or more of the operations 410-448.

In one or more embodiments, the operational flow 400 is shown comprising the operations 410-448 performed by a user equipment 112*a*, an installation interface 402, the server 102, and/or an access interface 404. The installation interface 402 may be one or more of the peripherals included in the server I/O interfaces 124 of the server 102 and/or one or more peripherals included in the UE I/O interfaces of the user equipment 112*a*. The access interface 404 may be one or more of the peripherals included in the server I/O interfaces 124 of the server 102, one or more peripherals included in the UE I/O interfaces of the user equipment 112*a*, and/or one or more OEM interfaces of the OEM-controlled system 115.

In one or more embodiments, the server 102 may be configured to automate monitoring of databases and/or servers for new service builds, identifying compatible devices configured to receive the service builds, installing (e.g., flashing) the builds onto the devices, and troubleshooting any errors that may occur. The server 102 may be configured to run continuously, allowing for parallel installation of services 155 on multiple devices and providing real-time notifications to the server 102 and/or users 1163 upon successful upgrades. With advanced error handling and troubleshooting capabilities, the server 102 may be configured to ensure smooth and reliable installation processes, reducing downtime and increasing operational efficiency in certification operations. The server 102 may be configured to automatically retrieve and install services 155 in one or more communication devices based on predefined conditions and/or test scenarios. The server 102 may be configured to determine errors and/or configuration conflicts 147 during the integration operations 104. In the event that errors and/or configuration conflicts 147 are determined, the server 102 may be configured to generate one or more possible solutions to modify configurations of the services 155 and/or behavior of the peripherals to remove the errors and/or configuration conflicts 147.

In one or more embodiments, the server 102 is configured to monitor databases and/or servers for new service builds, identify devices compatible with the new service builds, install the new application builds onto compatible devices, and manage and troubleshoot any errors that occur during the integration operations 104. Further, the server 102 may be configured to wait install specific service builds on one or more communication devices automatically. The server 102 may be configured to successfully upgrade service builds in the communication devices dynamically and/or periodically over time. In some embodiments, the server 102 may be configured to install one or more services 155 in parallel on multiple communication devices.

The operational flow 400 may start at operation 410, where the server 102 configured to monito one or more service releases via an access interface of the OEM-controlled system 115. The server 102 may be configured to dynamically and/or periodically reach to the access interface 404 to retrieve availability of release versions 154 in the OEM-controlled system 115. At operation 412, the server 102 may be configured to receive one or more updated service release versions 154 from the access interface 404. At operation 420 the user equipment 112*a* may be configured to establish and/or determine one or more performance parameters as part of one or more initiation operations where the user equipment 112*a* is started. In some embodiments, the user equipment 112*a* may be configured to determine one or more current performance parameters based on previously known performance parameters and/or previous feedback generated by the user equipment 112*a*. The performance parameters may be representative of one or more aspects of a peripheral that the server 102 is configured to evaluate over a period of time. At operation 422, the user equipment 112*a*, the installation interface 402, and/or the server 102 may be configured to establish a communication link 114*a*. In one or more embodiments, the installation interface 402 is an API located at the user equipment 112*a* and/or the server 102 that enables installation of specific configuration elements and/or services 155 in the user equipment 112*a*. To establish the communication link 114*a*, the server 102 may be configured to broadcast connectivity information in an assessment environment 108. In turn, the user equipment 112*a* may be configured to receive the broadcasted connectivity information, parse connectivity commands from the connectivity information, and use the connectivity commands to provide a reply message to the server 102. At operation 424, the user equipment 112*a*, the installation interface 402, and/or the server 102 may be configured to determine communication device information 136*a* corresponding to the user equipment 112*a*. The user equipment 112*a* may be configured to share one or more information elements with the server 102. In turn, the server 102 may be configured to aggregate the information elements from the user equipment 112*a* and determine the communication device information 136*a* based on the information elements exchanged. In some embodiments, the server 102 may be configured to receive the communication device information 136*a* directly from the user equipment 112*a*. At operation 426, the server 102 may be configured to determine one or more evaluation operations 103 to evaluate one or more communication operations 153 as performed in the user equipment 112*a* based on the communication device information 136*a*. At operation 428, the server 102 may be configured to determine one or more services 155 configured to perform the one or more communication operations 153*a*. While the operations 424-426, are shown in sequential order, as described above, a different order may be followed. For example, the server 102 may be configured to determine one or more services 155 that need to be evaluated. Then, the server may be configured to determine one or more evaluation operations 103 to analyze one or more changes in system parameters 157. At this stage, the server 102 may be configured to determine communication device information 136*a* based on the services 155 and the evaluation operations 103. At operation 430, the server 102 may be configured to generate one or more access commands 133 that integrate one or more system parameters 157 configured to trigger installation of the specific services 155 in the user equipment 112 and execution of one or more specific evaluation operations 103 as the services 155 cause peripherals of the user equipment 112*a* to perform one or more communication operations 153.

The operation flow 400 may continue at operations 432-442. At operation 432, the user equipment 112*a* and/or the installation interface 402 may be configured to verify access to updated releases. At operation 434, the access interface 404 may be configured to obtain updated service releases. At operation 436, the server 102 may be configured to trigger one or more service installation. At operation 438, the installation interface 402 may be configured to forward one or more service installation of services 155 in the user equipment 112. At operation 440, the user equipment 112*a*, the installation interface 402, the server 102, and/or the access interface 406 may be configured to install the selected release versions 154 of the services 155 in the user equipment 112*a*. At operation 442, the user equipment 112*a* may be configured to transmit feedback to the server 102. Herein, the feedback may indicate whether the installation of the services 155 is completed.

The operation flow 400 may conclude at operations 444-448. At operation 444, the server 102 may be configured to determine that the selected versions of the services 155 are installed in the user equipment 112. At operation 446, the user equipment 112*a*, the installation interface 402, the server 102, and/or the access interface 406 may be configured to release the communication link 114*a* to a testing platform. In some embodiments, another network component communicatively coupled to the server 102 via the networks 109 may be configured to perform one or more of the evaluation operations 103. In some embodiments, the server 102 may be configured to comprise the testing platform. In this regard, releasing to the testing platform may refer to the server 102 transitioning from performing integration operations 104 to install services 155 and/or OS in the user equipment 112*a* to performing one or more of the evaluation operations 103. At operation 448, the server 102 may be configured to obtain one or more additional service releases from the access interface 404.

Example Process to Integrate Operational System Parameters In Communication Devices In an Assessment Environment FIG. 5 illustrate respective example flowchart of the process 500, in accordance with one or more embodiments. Modifications, additions, or omissions may be made to the process 500. The process 500 may include more, fewer, or other operations than those shown in FIG. 5. For example, operations may be performed in parallel or in any suitable order. While at times discussed as performed by the server 102, one or more of the user equipment 112, one or more parts of the reference repository 113, one or more parts of the OEM-controlled system 115, components of any of thereof, or any suitable system or components of the communication system 100 may perform one or more operations of the process 500. For example, one or more operations of the process 500 may be implemented, at least in part, in the form of server instructions 132 of FIG. 1, stored on non-transitory, tangible, machine-readable media (e.g., server memory 130 of FIG. 1 operating as a non-transitory computer-readable medium) that when run by one or more processors (e.g., the server processor 120 of FIG. 1) may cause the one or more processors to perform operations described in operations 502-536.

In one or more embodiments, the process 500 may comprise automating integration of services 155 (e.g., applications, OS, and the like) in communication devices (e.g., any device with wired and/or wireless communication capabilities) prior to performing one or more testing operations during one or more certification operations, the process 500 may be configured to ready a communication device for testing operations. The process 500 comprises gathering services 155 available for a specific communication device, selecting specific services 155*a* out of the services 155 available, configuring the specific services 155*a* for the specific communication device, install (e.g., flash) these services onto the communication device, and configuring the services 155 in the communication device in preparation of one or more evaluations and/or tests. In some embodiments, the process 500 comprises installing the specific services 155*a* onto the communication devices by: (1) selecting a device that is selected and/or approved for testing and/or (2) testing to be performed. Under (1), the process 500 starts by selecting services 155 that are compatible with the device. Under (2), the process 500 starts by selecting devices that are compatible to receive a specific test. In some embodiments, integration operations 104 comprise automatically installing the services 155*a* after determining testing parameters for a specific communication device and/or specific communication devices for a specific testing operation.

The process 500 starts at operation 502, where the server 102 may be configured to establish a communication link 114*a* with a communication device. At operation 504, the server 102 may be configured to determine communication device information 136*a* associated with the communication device. The communication device information 136*a* may be comprise a manufacture year 137*a* and a model 138. At operation 506, the server 102 may be configured to determine one or more hardware testing operations based on the communication device information 136*a*. The server 102 may be configured to determine the hardware testing operations based on the manufacture year 137*a* and/or the model 138*a*. The hardware testing operations may be one or more evaluation operations 103 in which the server 102 is configured to evaluate changes in performance parameters of the communication device. At operation 508, the server 102 may be configured to determine one or more services 155 configured to execute the hardware testing operations based on the communication device information 136*a*.

The server 102 may be configured to determine one or more services 155 configured to execute the hardware testing operations on the communication device based on the manufacture year 137*a* and/or the model 138*a*. At operation 510, the server 102 may be configured to determine a reference release version 154*a* of the services 155. At operation 512, the server 102 may be configured to receive a manufacturer release version 154*b* (e.g., one r the OEM service releases 186) from an access interface (e.g., the access interface 404).

The process 500 continues at operation 520, where the server 102 may be configured to determine whether the reference release version 154*a* is equal to the manufacturer release version 154*b*. Herein, the server 102 may be configured to determine whether the latest release version 154 of the services 155 are available for installation. If the server 102 determines that the reference release version 154*a* is equal to the manufacturer release version 154*b* (i.e., YES), the process 500 proceeds to operation 522. At operation 522, the server 102 is configured to determine that the reference release version 154*a* is the latest release version available. If the server 102 determines that the reference release version 154*a* is not equal to the manufacturer release version 154*b* (i.e., NO), the process 500 proceeds to operation 532. At operation 532, the server 102 may be configured to determine that the manufacturer release version **154*b*** is the latest release versions available.

The process 500 may conclude at operation 534 and operation 536. At operation 534, the server 102 is configured to install the corresponding latest release versions 154 of the services 155 into the communication device. The server 102 may be configured to install the corresponding latest release versions 154 of the services 155 into the communication device in response to determining that corresponding latest release versions of the services 155 are available for installation. At operation 536, the server 102 may be configured to release the communication link 114 with the communication device to a testing platform.

In one or more embodiments, the communication device information 136 is updated dynamically based on external triggers and/or periodically over time. In some embodiments, the process 500 may be performed in series for multiple communication device such that integration operations 104 are performed for one communication device after another. Further, the process 500 may be performed in parallel for multiple communication device such that integration operations are performed at least partially at a same time.

Operation Flow to Retrieve And Install Operational System Parameters In an Assessment Environment FIG. 6 illustrates an example operation flow 600 implemented by the communication system 100 of FIG. 1, in accordance with one or more embodiments. The operation flow 600 may comprise one or more of the retrieval operations 105 and/or the installation operations 106 described in reference to FIG. 1. While the operation flow 600 comprises multiple operations 610-638 are shown to be performed by the server 102, one or more of the user equipment 112, one or more parts of the reference repository 113, one or more parts of the OEM-controlled system 115, additional electronic devices or components in the server 102 (e.g., the server processor 120 in the server 102), in the user equipment 112 (e.g., the UE processor 194 in the user equipment **112*a*), or in the reference repository 113 (e.g., the repository I/O interfaces 170 in the reference repository 113) may be configured to perform one or more of the operations 610-638**.

In one or more embodiments, the operational flow 600 is shown comprising the operations 610-638 performed by a repository interface 602, the selection interface 604, the server 102, and/or an access interface 606. The repository interface 602 may be one or more of the peripherals included in the repository I/O interfaces 170. The selection interface 604 may be one or more of the peripherals included in the server I/O interfaces 124 of the server 102 and/or one or more peripherals included in the UE I/O interfaces of the user equipment **112*a*. The access interface 606 may be one or more of the peripherals included in the server I/O interfaces 124 of the server 102, one or more peripherals included in the UE I/O interfaces of the user equipment 112*a*, and/or one or more OEM interfaces of the OEM-controlled system 115**.

In one or more embodiments, the server 102 may be configured to automate the process of monitoring, retrieving, and installing OEM services 155 and/or software resources that are initially stored in OEM-controlled systems 115. The server 102 may be configured to scrape information found in the OEM-controlled system 115 for service names and release dates, compares the scrapped information with previously saved information, notifies users 116 of any changes, and downloads (e.g., obtains) new service builds, if available. The server 102 may be configured to copy and/or save these builds to the reference repository 113 (e.g., a unified server) enabling accelerated retrieval and/or offline retrieval during one or more retrieval operations 105. The server 102 may be configured to monitor the OEM-controlled system 115 and con tenuously, periodically, and/or specific time durations. In one or more embodiments, the server 102 is configured to retrieve specific release versions 154 and/or specific services 155.

The operational flow 600 may start at operation 610, where the server 102 and/or the access interface 606 are configured to request manufacture (e.g., OEM) service releases **186*a* of one or more services 155*a*. At operation 612, the server 102 may be configured to request information on one or more reference service releases 173*a* of the one or more services 155*a*. The requested information may be based on the one or more manufactured service releases 186*a* to be obtained from the access interface 606 associated with the OEM-controlled system 115. At operation 614, the repository interface 602 and/or the selection interface 604 may be configured to determine one or more reference service releases 173*a* in the reference repository 113 based on the request information. At operation 616, the server 102 may be configured to obtain one or more of the manufacturer service releases 186*a* requested from the access interface 606. At operation 618, the repository interface 602 and/or the selection interface 604 may be configured to transmit one or more of the reference service releases 173*a* from the reference repository 113 to the server 102**.

The operation flow 600 may continue at operations 620-624. At operation 620, the server 102 may be configured to transform a first format of the manufacturer service releases **186*a* to a second format. The reference service releases 173*a* comprise a corresponding localized format 174*a* and the manufacturer service releases 186*a* comprise a corresponding predefined format 187*a*. In some embodiments, the server 102 may be configured to transform the manufacturer service releases 186*a* from the predefined format 187 determined by the OEM at the OEM-controlled system 115 to a localized format 174*a* determined by the server 102 and/or the reference repository 113. At operation 622, the server 102 is configured to evaluate whether the reference service releases 173*a* are equal to a transformed version of the manufacturer releases 186*a*. If the server 102 determines that the reference service releases 173*a* are equal to the transformed version of the manufacturer releases 186*a*, then the server 102 may determine that the reference repository 113 comprises the latest release version 154*a* for the services 155*a*. If the server 102 determines that the reference service releases 173*a* are not equal to the transformed version of the manufacturer releases 186*a*, then the server 102 may determine that the reference repository 113 does not comprise the latest release version 154*a* for the services 155*a*. At operation 624, the server 102 may be configured to transmit one or more evaluation results to the selection interface 604. The evaluation results may reference that at least a portion of the reference service releases 173*a* are equal to the transformed version of the manufacturer releases 186*a*. The evaluation results may reference that at least a portion of the reference service releases 173*a* are not equal to the transformed version of the manufacturer releases 186*a*. The evaluation results may reference specific services 155 out of the services 155*a* that may be associated with the reference service releases 173*a* and/or the manufacture service releases 186*a*** evaluated.

The operation flow 600 may conclude at operations 630-638, where the server 102 determines that the at least a portion of the reference service releases 173*a* are not equal to the transformed version of the manufacturer releases 186*a*. At operation 630, the selection interface 604 and/or the repository interface 602 may be configured to update the reference service releases 173*a* based on the evaluation results such that the reference repository 113 comprises the latest release version 154*a* for the services 155*a*. At operation 632, the server 102 and/or the access interface 606 may be configured to monitor additional manufacturer service releases 186 over time. At operation 634, the server 102 may be configured to download updated manufacturer service releases 186 dynamically, periodically, and/or over a predefined time duration. At operation 638, the server 102, the repository interface 602, and/or the selection interface 604 may be configured to update the reference service releases 173 to include the transformed version of the manufacturer service releases 186*a*. The operational flow 600 may comprise updating the reference service releases 173 to include the manufacturer service releases 186 that were not already found in the reference repository 113.

Example Process to Retrieve And Install Operational System Parameters In an Assessment Environment FIG. 7 illustrate respective example flowchart of the process 700, in accordance with one or more embodiments. Modifications, additions, or omissions may be made to the process 700. The process 700 may include more, fewer, or other operations than those shown in FIG. 7. For example, operations may be performed in parallel or in any suitable order. While at times discussed as performed by the server 102, one or more of the user equipment 112, one or more parts of the reference repository 113, one or more parts of the OEM-controlled system 115, components of any of thereof, or any suitable system or components of the communication system 100 may perform one or more operations of the process 700. For example, one or more operations of the process 700 may be implemented, at least in part, in the form of server instructions 132 of FIG. 1, stored on non-transitory, tangible, machine-readable media (e.g., server memory 130 of FIG. 1 operating as a non-transitory computer-readable medium) that when run by one or more processors (e.g., the server processor 120 of FIG. 1) may cause the one or more processors to perform operations described in operations 702-760.

In one or more embodiments, the process 700 may comprise automating collection of builds of services 155 (e.g., applications, OS, and the like) to be used in communication devices (e.g., any device with wireless communication capabilities). The builds may be updates and/or new versions of services 155 and operating systems that are the basis for testing operations performed during certification operations. The process comprises retrieving new builds from websites/databases/communication systems (e.g., the OEM-controlled system 115) associated with a specific OEM. These builds may be stored in a centralized data repository (e.g., the reference repository 113) from which testing teams may be available to retrieve service builds over time. The process 700 may comprise reaching build repository may be reached from any testing teams at any point in time. Further, the process 700 may be configured to dynamically retrieve new builds for specific services 155. In some embodiments, the process 700 may be configured to generate alerts indicating that new builds are generated and/or available.

The process 700 starts at operation 702, where the server 102 may be configured to access one or more release versions 154 of one or more services 155 matching a communication device information 136.

The process 700 continues at operation 710, where the server 102 may be configured to determine whether there are multiple release versions 154 in the OEM-controlled system 115. If the server 102 determines that there are no multiple release versions 154 in the OEM-controlled system 115 (i.e., NO), the process 700 proceeds to operation 712. At operation 712, the server 102 is configured to determine that the release version is the newest release version. If the server 102 determines that there are multiple release versions 154 in the OEM-controlled system 115 (i.e., YES), the process 700 proceeds to operation 722 and operation 724. At operation 722, the server 102 is configured to sort the release versions 154 of the services 155 in accordance with one or more sorting parameters. In some embodiments, the sorting parameters may comprise a file size and/or a release date among others. At operation 724, the server 102 may be configured to determine the newest release version out of the sorted release versions.

At operation 726, the server 102 is configured to copy the newest release version 154*a* onto a centralized data repository (e.g., the reference repository 113). The release version 154*a* may comprise a predefined format 187*a* that associates the release version 154*a* with the centralized data repository. At operation 728, the server 102 may be configured to transform the release version 154*a* from the predefined format 187*a* to a localized format 174*a* that associates the release version 154*a* to the centralized data repository. At operation 730, the server 102 may be configured to parse the release version 154*a* to determine one or more information elements. In some embodiments, each information element references one or more changes to one or more communication parameters (e.g., performance parameters) of at least one communication device matching the communication device information 136. Further, each communication parameter may be configured to trigger one or more communication operations 153 in the communication device.

The process 700 continues at operation 740, where the server 102 may be configured to determine whether there are multiple information elements in the release version 154*a*. If the server 102 determines that there are no multiple information elements in the release version 154*a* (i.e., NO), the process 700 proceeds to operation 742. At operation 742, the server 102 may be configured to assign a specific priority tier 149 to the information element. The process 700 may proceed to operation 754 after operation 742. If the server 102 that there are no multiple information elements in the release version 154*a* (i.e., YES), the process 700 proceeds to operation 752. At operation 752, the server 102 may be configured to categorize each information element based on one or more priority tiers 149 based on the one or more changes.

The process 700 may conclude at operations 754-760. At operation 754, the server 102 is configured to generate release triggers 152 for each information element in accordance with corresponding priority tier(s) 149. The server 102 may be configured to generate release triggers 152 for each information element in accordance with corresponding priority tiers 149. The release triggers 152 may be configured to reference one or more of the information elements associated with the corresponding priority tiers 149. At operation 756, the server 102 may be configured to attach the release triggers 152 to the release version comprising the localized format 174 in the centralized data repository. At operation 758, the server 102 may be configured to generate a report 142*a* referencing that the release version 154*a* is available for installation. At operation 760, the server 102 may be configured to broadcast the report 142*a* to one or more communication devices matching the communication device information 136.

In one or more embodiments, the reference repository 113 may be configured to store the reference service releases 173 in the localized format 174 and a corresponding predefined format 187. The priority tiers 149 may be one or more data types. Each of the priority tiers 149 may correspond to a data type that the information elements are configured to modify on the one or more communication parameters of a given communication device matching specific communication device information 136. The priority tiers 149 may be one or more build types. Each of the priority tiers 149 may correspond to a build type that the information elements are configured to modify on the one or more communication parameters of a given communication device matching specific communication device information 136.

Operation Flow to Automate Generation of Assessment Reports In an Assessment Environment FIG. 8 illustrates an example operation flow 800 implemented by the communication system 100 of FIG. 1, in accordance with one or more embodiments. The operation flow 800 may comprise one or more of the assessment operations 107 described in reference to FIG. 1. While the operation flow 800 comprises multiple operations 810-840 are shown to be performed by the server 102, one or more of the user equipment 112, one or more parts of the reference repository 113, one or more parts of the OEM-controlled system 115, additional electronic devices or components in the server 102 (e.g., the server processor 120 in the server 102), in the user equipment 112 (e.g., the UE processor 194 in the user equipment 112*a*), or in the reference repository 113 (e.g., the repository I/O interfaces 170 in the reference repository 113) may be configured to perform one or more of the operations 810-840.

In one or more embodiments, the operational flow 800 is shown comprising the operations 810-840 performed by a user equipment 112*a*, a retrieval interface 802, the server 102, and/or an access interface 804. The retrieval interface 802 may be one or more of the peripherals included in the server I/O interfaces 124 of the server 102 and/or one or more peripherals included in the UE I/O interfaces of the user equipment 112*a*. The access interface 804 may be one or more of the peripherals included in the server I/O interfaces 124 of the server 102, one or more peripherals included in the UE I/O interfaces of the user equipment 112*a*, and/or one or more OEM interfaces of the OEM-controlled system 115.

In one or more embodiments, the server 102 may be configured to automate monitoring one or more OEM-controlled systems 115 to determine current communication guidelines 185. The server 102 may be configured to analyze the communication guidelines 185 to determine formats, templates, and approaches for communicating with the OEM-controlled systems via the connections 119. The server 102 may be configured to analyze retrieved data to compile statistics and generate reports 142 to one or more users 116. The server 102 may be configured to operate on a set schedule to retrieve the communication guidelines 185 dynamically, periodically, and/or for a predefined period of time.

The operational flow 800 may start at operation 810, where the server 102 is configured to monitor communication guidelines 185 in the OEM-controlled system 115. The server 102 may be configured to request status of current release versions 154 at the OEM-controlled system 115 for one or more services 155. The server 102 may be configured to retrieve communication guidelines 185 dynamically as soon as updates are generated and/or uploaded at the OEM-controlled system 115. The server 102 may be configured to retrieve communication guidelines 185 periodically over-time. The server 102 may be configured to retrieve communication guidelines 185 on demand by creating and transmitting requests for new release versions 154 to the OEM-controlled system 115. At operation 812, the server 102 may be configured trigger one or more communication operations 153. At operation 820, the user equipment 112*a* may be configured to establish and/or determine one or more performance parameters as part of one or more initiation operations where the user equipment 112*a* is started. In some embodiments, the user equipment 112*a* may be configured to determine one or more current performance parameters based on previously known performance parameters and/or previous feedback generated by the user equipment 112*a*. The performance parameters may be representative of one or more aspects of a peripheral that the server 102 is configured to evaluate over a period of time.

The operation flow 800 may continue at operations 822-834. At operation 822, the user equipment 112*a* may perform one or more communication operations 153 at the user equipment 112*a*. The user equipment 112*a* may be configured to perform one or more of the communication operations 153 triggered in response to executing one or more scripts 150 form the server 102. At operation 824, the user equipment 112*a* is configured to generate feedback comprising one or more changes to performance parameters for one or more peripherals over time. The server 102 may be configured to maintain ongoing communications with the user equipment 112*a* to trigger one or more of the evaluation operations 103. At operation 826, the user equipment 112*a* may be configured to transmit the feedback to the retrieval interface 802 and/or the server 102. At operation 828, the server 102 is configured to receive the feedback and analyze the received feedback. At operation 830, the user equipment 112*a*, the retrieval interface 802, and/or the server 102 may be configured to determine assessment operations that caused the feedback. For example, the server 102 may be configured to determine one or more evaluation operations 103 that caused the communication operations 153 thar were performed at the user equipment 112*a* based on a processing format 158 of the received feedback. At operation 832, the server 102 may be configured to request updated communication guidelines 185 from the access interface 804. At operation 834, the access interface 804 may be configured to transmit one or more updated communication guidelines 185 to the server 102.

The operation flow 800 may conclude at operations 836-840. At operation 836, the server 102 may be configured to generate one or more reports 142 in accordance with the one or more updated communication guidelines 185. At operation 838, the server 102 may be configured to transmit the one or more reports 142 to the retrieval interface 802 and/or the access interface 804. At operation 840, the retrieval interface 802, the access interface 804, and/or the server 102 may be configured to submit the feedback report to a manufacturing system (e.g., OEM). The server 102 may be configured to transmit the one or more reports 142 to the access interface 804 in the OEM-controlled system 115.

Example Process to Automate Generation of Assessment Reports In an Assessment Environment FIG. 9 illustrate respective example flowchart of the process 900, in accordance with one or more embodiments. Modifications, additions, or omissions may be made to the process 900. The process 900 may include more, fewer, or other operations than those shown in FIG. 9. For example, operations may be performed in parallel or in any suitable order. While at times discussed as performed by the server 102, one or more of the user equipment 112, one or more parts of the reference repository 113, one or more parts of the OEM-controlled system 115, components of any of thereof, or any suitable system or components of the communication system 100 may perform one or more operations of the process 900. For example, one or more operations of the process 900 may be implemented, at least in part, in the form of server instructions 132 of FIG. 1, stored on non-transitory, tangible, machine-readable media (e.g., server memory 130 of FIG. 1 operating as a non-transitory computer-readable medium) that when run by one or more processors (e.g., the server processor 120 of FIG. 1) may cause the one or more processors to perform operations described in operations 902-928.

In one or more embodiments, the process 900 may comprise automating generation and upload of test reports and/or feedback reports to one or more OEMs and/or OEM-controlled interfaces. The reports 142 may comprise error results, test commands, and testing operations performed to test services 155 (e.g., applications, OS, and the like) in communication devices (e.g., any device with wireless communication capabilities) during certification operations. In particular, the processor 900 may be configured to compile some or all information (e.g., testing parameters, testing conditions, and the like) associated with test results 139 from the certification operations. Herein, the process 900 may comprise determining one or more evaluations and/or tests performed in specific services, collecting data associated with the test results, determining an OEM-specific test reports, determining relevant data elements to fill a test report, filling the test report in association with a specific communication device, and providing the test report to the OEM directly and/or indirectly. The process 900 may be configured to provide error reports to the OEM using the OEM-approved formatting and/or the OEM-approved templates. In some embodiments, reporting is done automatically upon determining test results 139 indicating errors as part of the one or more evaluation (e.g., testing) operations.

The process 900 starts at operation 902, where the server 102 may be configured to receive one or more test results 139 referencing changes of one or more performance parameters of a communication device over a period of time. At operation 904, the server 102 may be configured to determine one or more hardware testing operations that were performed on the communication device to obtain the test results 139. At operation 906, the server 102 may be configured to associate the test results 139 and the hardware testing operations to a communication device information 136 associated with the communication device. At operation 908, the server 102 may be configured to determine whether a communication link 114*a* is established with a data retrieval interface (e.g., the OEM interfaces 180 in the OEM-controlled system 115).

The process 900 continues at operation 910, where the server 102 may be configured to determine whether a communication link 114*a* is established between the server 102 and the data retrieval interface. If the server 102 determines that there is no communication link 114*a* is established between the server 102 and the data retrieval interface (i.e., NO), the process 300 proceeds to operation 912. At operation 912, the server 102 is configured to generate a report 142*a* comprising the test results 139 and the hardware testing operations. If the server 102 determines that a communication link 114*a* is established between the server 102 and the data retrieval interface (i.e., YES), the process 900 proceeds to operation 922. At operation 922, the server 102 may be configured to retrieve communication guidelines 185 from the data retrieval interface based on the communication device information 136. The server 102 may be configured to retrieve and/or obtain the communication guidelines 185 from the OEM-controlled system 115 based on a manufacture year 137*a* and a model 138 of a communication device (e.g., user equipment 112*a*). At operation 924, the server 102 may be configured to correlate each of the test results 139 to one or more of the hardware testing operations. At operation 926, the server 102 may be configured to generate a report 142*a* comprising a visual depiction 143*a* of the correlation of the test results 139 and the hardware testing operations over the period of time.

The process 900 may conclude at operation 928, where the server 102 is configured to transmit the report 142 to the data retrieval interface.

In one or more embodiments, the process 900 may be performed to generate reports 142 in series, sequence, and/or in parallel. In series, the reports 142 may be generated and/or transmitted one after the other as soon as the reports 142 are completed and/or in accordance with a schedule. In sequence, the reports 142 may be generated and/or transmitted at least partially at a same time and/or one after the other in a specific order and/or sequence. In parallel, the reports 142 may be generated and/or transmitted at least partially at a same time. In some embodiments, the data retrieval interface is controlled by an OEM of the communication device. The data retrieval interface may be accessed via a communication link 114 established via a web page.

Scope of The Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. An apparatus, comprising:

a memory operable to store:

communication device information associated with one or more communication devices, each communication device information comprising manufacturing information; and a processor communicatively coupled to the memory and configured to:

access a plurality of release versions of one or more services matching the communication device information;

sort the plurality of release versions of the one or more services in accordance with a release date;

determine a first release version out of the plurality of release versions, the first release version comprising a first release date;

copy the first release version onto a centralized data repository, the first release version comprising a predefined format that associates the first release version to the centralized data repository;

transform the predefined format to a localized format that associates the first release version to the centralized data repository;

parse the first release version to determine a plurality of information elements, wherein:

each information element of the plurality of information elements reference one or more changes to one or more communication parameters of at least one communication device matching the communication device information; and each communication parameter of the one or more communication parameters is configured to trigger one or more communication operations in the at least one communication device;

categorize each information element of the plurality of information elements based on a plurality of priority tiers based on the one or more changes;

generate release triggers for each information element of the plurality of information elements in accordance with corresponding priority tiers, the release triggers being configured to reference one or more of the plurality of information elements associated with the corresponding priority tiers;

attach the release triggers to the first release version comprising the localized format in the centralized data repository;

generate a report referencing that the first release version is available for installing at the centralized data repository; and broadcast the report to the at least one communication device matching the communication device information.

2. The apparatus of claim 1, wherein the centralized data repository comprises:

the first release version in the predefined format; and the first release version in the localized format.

3. The apparatus of claim 1, wherein:

each priority tier of the plurality of priority tiers corresponds to a data type that the plurality of information elements is configured to modify on the one or more communication parameters of the at least one communication device matching the communication device information.

4. The apparatus of claim 1, wherein:

each priority tier of the plurality of priority tiers corresponds to an operation type of the one or more communication operations that the one or more communication parameters of the at least one communication device matching the communication device information are configured to trigger.

5. The apparatus of claim 1, wherein:

each priority tier of the plurality of priority tiers corresponds to a device type of the at least one communication device matching the communication device information.

6. The apparatus of claim 1, wherein:

the plurality of release versions of the one or more services are accessed dynamically in response to determining a change in a number of the plurality of release versions.

7. The apparatus of claim 1, wherein:

the plurality of release versions of the one or more services are accessed periodically over time.

8. A method, comprising:

accessing a plurality of release versions of one or more services matching communication device information;

sorting the plurality of release versions of the one or more services in accordance with a release date;

determining a first release version out of the plurality of release versions, the first release version comprising a first release date;

copying the first release version onto a centralized data repository, the first release version comprising a predefined format that associates the first release version to the centralized data repository;

transforming the predefined format to a localized format that associates the first release version to the centralized data repository;

parsing the first release version to determine a plurality of information elements, wherein:

each information element of the plurality of information elements reference one or more changes to one or more communication parameters of at least one communication device matching the communication device information; and each communication parameter of the one or more communication parameters is configured to trigger one or more communication operations in the at least one communication device;

categorizing each information element of the plurality of information elements based on a plurality of priority tiers based on the one or more changes;

generating release triggers for each information element of the plurality of information elements in accordance with corresponding priority tiers, the release triggers being configured to reference one or more of the plurality of information elements associated with the corresponding priority tiers;

attaching the release triggers to the first release version comprising the localized format in the centralized data repository;

generating a report referencing that the first release version is available for installing at the centralized data repository; and broadcasting the report to the at least one communication device matching the communication device information.

9. The method of claim 8, wherein the centralized data repository comprises:

the first release version in the predefined format; and the first release version in the localized format.

10. The method of claim 8, wherein:

each priority tier of the plurality of priority tiers corresponds to a data type that the plurality of information elements is configured to modify on the one or more communication parameters of the at least one communication device matching the communication device information.

11. The method of claim 8, wherein:

each priority tier of the plurality of priority tiers corresponds to an operation type of the one or more communication operations that the one or more communication parameters of the at least one communication device matching the communication device information are configured to trigger.

12. The method of claim 8, wherein:

each priority tier of the plurality of priority tiers corresponds to a device type of the at least one communication device matching the communication device information.

13. The method of claim 8, wherein:

the plurality of release versions of the one or more services are accessed dynamically in response to determining a change in a number of the plurality of release versions.

14. The method of claim 8, wherein:

the plurality of release versions of the one or more services are accessed periodically over time.

15. A non-transitory computer-readable medium storing instructions that when executed by a processor cause the processor to:

access a plurality of release versions of one or more services matching communication device information;

sort the plurality of release versions of the one or more services in accordance with a release date;

determine a first release version out of the plurality of release versions, the first release version comprising a first release date;

copy the first release version onto a centralized data repository, the first release version comprising a predefined format that associates the first release version to the centralized data repository;

transform the predefined format to a localized format that associates the first release version to the centralized data repository;

parse the first release version to determine a plurality of information elements, wherein:

each information element of the plurality of information elements reference one or more changes to one or more communication parameters of at least one communication device matching the communication device information; and each communication parameter of the one or more communication parameters is configured to trigger one or more communication operations in the at least one communication device;

categorize each information element of the plurality of information elements based on a plurality of priority tiers based on the one or more changes;

generate release triggers for each information element of the plurality of information elements in accordance with corresponding priority tiers, the release triggers being configured to reference one or more of the plurality of information elements associated with the corresponding priority tiers;

attach the release triggers to the first release version comprising the localized format in the centralized data repository;

generate a report referencing that the first release version is available for installing at the centralized data repository; and broadcast the report to the at least one communication device matching the communication device information.

16. The non-transitory computer-readable medium of claim 15, wherein the centralized data repository comprises:

the first release version in the predefined format; and the first release version in the localized format.

17. The non-transitory computer-readable medium of claim 15, wherein:

each priority tier of the plurality of priority tiers corresponds to a data type that the plurality of information elements is configured to modify on the one or more communication parameters of the at least one communication device matching the communication device information.

18. The non-transitory computer-readable medium of claim 15, wherein:

each priority tier of the plurality of priority tiers corresponds to an operation type of the one or more communication operations that the one or more communication parameters of the at least one communication device matching the communication device information are configured to trigger.

19. The non-transitory computer-readable medium of claim 15, wherein:

each priority tier of the plurality of priority tiers corresponds to a device type of the at least one communication device matching the communication device information.

20. The non-transitory computer-readable medium of claim 15, wherein:

the plurality of release versions of the one or more services are accessed dynamically in response to determining a change in a number of the plurality of release versions.

* * * * *